US008496472B2

(12) United States Patent
Roberts et al.

(10) Patent No.: US 8,496,472 B2
(45) Date of Patent: Jul. 30, 2013

(54) PROCESS FOR COMBUSTION OF HIGH VISCOSITY LOW HEATING VALUE LIQUID FUELS

(75) Inventors: William L. Roberts, Raleigh, NC (US); Brian Metzger, Augusta, GA (US); Timothy L. Turner, Chapel Hill, NC (US)

(73) Assignee: North Carolina State University, Raleigh, NC (US)

( * ) Notice: Subject to any disclaimer, the term of this patent is extended or adjusted under 35 U.S.C. 154(b) by 1455 days.

(21) Appl. No.: 12/133,571

(22) Filed: Jun. 5, 2008

(65) Prior Publication Data

US 2008/0305445 A1 Dec. 11, 2008

Related U.S. Application Data

(60) Provisional application No. 60/942,290, filed on Jun. 6, 2007.

(51) Int. Cl.
*F23D 11/24* (2006.01)
*F23D 11/44* (2006.01)
*F23D 3/40* (2006.01)

(52) U.S. Cl.
USPC ............... 431/9; 431/11; 431/158; 237/12.1; 110/203; 110/322; 60/272; 60/320; 60/685

(58) Field of Classification Search
USPC ............... 431/9, 11, 158; 237/12.1; 110/203, 110/322; 60/272, 320, 685
IPC ..................................... F23D 11/24,11/44, 3/40
See application file for complete search history.

(56) References Cited

U.S. PATENT DOCUMENTS

| 2,113,058 | A | * | 4/1938 | Mullen | 423/542 |
|---|---|---|---|---|---|
| 3,003,546 | A | * | 10/1961 | Beach et al. | 431/265 |
| 3,237,677 | A | * | 3/1966 | Buchholz et al. | 122/236 |
| 3,237,680 | A | * | 3/1966 | Levin | 431/353 |
| 3,267,986 | A | * | 8/1966 | Olsson | 431/1 |

(Continued)

FOREIGN PATENT DOCUMENTS

| DE | 19622 601 | | 3/1998 |
|---|---|---|---|
| GB | 2096761 | A * | 10/1982 |
| WO | WO-2006/086814 | | 8/2006 |

OTHER PUBLICATIONS

"WO2006086814 MT.pdf", EPO.org, Machine Translation of WO-2006/086814, May 30, 2012.*

(Continued)

*Primary Examiner* — Steven B McAllister
*Assistant Examiner* — Daniel E Namay
(74) *Attorney, Agent, or Firm* — Womble Carlyle Sandridge & Rice, LLP

(57) ABSTRACT

The present invention is directed to a process for the clean and convenient combustion of high viscosity liquid fuels, such as glycerol, as well as an apparatus useful for carrying such processes. In certain embodiments, the invention provides a process for glycerol combustion comprising providing a combustion apparatus with a glycerol combustion chamber that facilitates reflective heating, pre-heating the glycerol combustion chamber, atomizing the reduced viscosity glycerol, and combining the atomized glycerol with air in the glycerol combustion chamber to thereby completely combust the glycerol. In one embodiment, such as when using a pressure-atomizing nozzle, the inventive method may further comprise treating the glycerol to reduce the glycerol viscosity.

12 Claims, 7 Drawing Sheets

U.S. PATENT DOCUMENTS

| | | | | |
|---|---|---|---|---|
| 3,320,999 | A | * | 5/1967 | Stalego .......................... 431/158 |
| 3,424,541 | A | | 1/1969 | Wang et al. |
| 3,441,375 | A | * | 4/1969 | MacGregor et al. ........... 423/319 |
| 3,693,559 | A | * | 9/1972 | Allen ............................. 110/185 |
| 3,756,764 | A | * | 9/1973 | Reichmann ..................... 431/37 |
| 3,791,796 | A | * | 2/1974 | Gamble et al. ................. 422/182 |
| 4,177,785 | A | * | 12/1979 | Sundeen .................. 123/179.21 |
| 4,225,305 | A | * | 9/1980 | Hazard et al. ................. 431/182 |
| 4,429,538 | A | * | 2/1984 | Sato et al. ........................ 60/748 |
| 4,848,249 | A | * | 7/1989 | LePori et al. .................. 110/234 |
| 5,196,181 | A | * | 3/1993 | Hartmann ...................... 423/613 |
| 5,249,952 | A | * | 10/1993 | West et al. ......................... 431/5 |
| 6,174,160 | B1 | * | 1/2001 | Lee et al. ......................... 431/11 |
| 6,174,501 | B1 | * | 1/2001 | Noureddini .................... 422/618 |
| 6,279,513 | B1 | * | 8/2001 | Virr ................................. 122/4 D |
| 7,661,420 | B2 | * | 2/2010 | Okayasu ........................ 126/210 |
| 7,805,923 | B2 | * | 10/2010 | Yoshida ...................... 60/39.464 |
| 8,263,272 | B2 | * | 9/2012 | Yoshikata et al. ............. 429/423 |
| 2002/0061271 | A1 | * | 5/2002 | Zauderer ................. 423/243.08 |
| 2002/0072021 | A1 | * | 6/2002 | Falvy et al. ................... 431/115 |
| 2005/0244329 | A1 | * | 11/2005 | Casanave et al. ............. 423/651 |
| 2007/0020575 | A1 | * | 1/2007 | Okayasu ........................ 431/354 |
| 2008/0134658 | A1 | * | 6/2008 | Yoshida ....................... 60/39.12 |

OTHER PUBLICATIONS

Chen et al., "A Comparison of Bluff-Body and Swirl-Stabilizing Flames," *Combust. Sci. and Tech.*, pp. 197-217, vol. 71.

Feikema et al., "Blowout of Nonpremixed Flames: Maximum Coaxial Air Velocities Achievable, with and without Swirl," *Combustion and Flame*, 1991, pp. 347-358, vol. 86.

Ho et al., "Determination of Airborne Carbonyls: Comparison of a Thermal Desorption/GC Method with the Standard DNPH/HPLC Method," *Environ. Sci. Technol.*, 2004, pp. 862-870, vol. 38.

Tangirala et al., "Effect of Heat Release and Swirl on the Recirculation within Swirl-Stabilized Flames," *Combust. Sci. and Tech*, 1987, pp. 75-95, vol. 51.

Van Gerpen, "Biodiesel Production Technology," NREL/SR-510-36244, Goldeon, Colorado (2004), www.osti.gov/bridge.

* cited by examiner

PROCESS FOR COMBUSTION OF HIGH VISCOSITY LOW HEATING VALUE LIQUID FUELS

CROSS-REFERENCE TO RELATED APPLICATIONS

The present application claims priority to U.S. Provisional Patent Application No. 60/942,290, filed Jun. 6, 2007, which is incorporated herein by reference in its entirety.

FIELD OF THE INVENTION

The present invention is directed to processes for combusting high viscosity liquid fuels. In particular, the invention is directed to a process for the clean and efficient combustion of glycerol.

BACKGROUND

Glycerol is a long known chemical compound having the structure shown in the formula below.

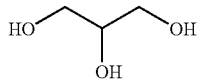

Glycerol, which is also known as glycerin or propane-1,2,3-triol, is in the general category of polyol compounds (i.e., compounds containing multiple hydroxyl groups) and finds application in many fields. For example, glycerol is used in many medical, pharmaceutical, and personal care preparations as a lubricant and a humectant, as an organic synthesis building block, as a food additive (e.g., humectant, solvent, sweetener softener, filler, or thickener), as an animal food ingredient, as a plasticizer and softener in plastics and cellophanes, and as an additive or in the preparation of many products, such as nitroglycerin, yarn, fabric, detergent, preservatives, antifreeze, and tobacco products.

In likely its most recognizable derivatives, glycerol forms the backbone of triglycerides, which are esters of glycerol and fatty acids. Thus, lipids sources (e.g., vegetable oils and animal fats) present a ready source of glycerol, which can be produced via saponification (such as in soap-making processes) or transesterification (such as in the production of biofuels).

As seen by the above multiple possible uses, glycerol is a marketable commodity; however, recent increases in the production of waste glycerol, such as in the production of biofuels, has led to an ever-increasing supply of crude glycerol, which is not in a pure form ready for such uses. Rather, crude glycerol must undergo refining and other purification steps to provide glycerol of sufficient purity for marketability, and such necessary treatments are generally found to be cost prohibitive. As a result, most crude glycerol presently being produced is merely discarded as a waste product.

Biofuels are gaining increasing popularity as an alternative to petroleum-derived fuels, particularly in light of increasing prices of crude oils and the fuel products based thereon (e.g., gasoline, diesel, and jet fuels). Biodiesel is one of the first biofuels to gain popularity as an alternative to petroleum-based fuels. During the manufacture of biodiesel via transesterification of plant oils, such as rape, soya, and palm oils, glycerol is produced as a by-product. For example, transesterification of triglycerides (e.g., from vegetable oils or animal fats) typically proceeds according to the reaction shown below,

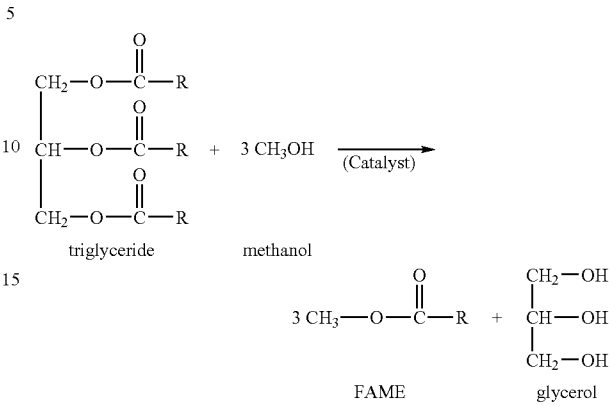

wherein each R represents hydrocarbon (e.g., a long chain fatty acid) and FAME represents a fatty acid methyl ester (i.e., the biodiesel molecule). Common base catalysts are potassium hydroxide and sodium hydroxide. According to such reactions, approximately 100 kg of glycerol is produced for every 1 ton of biodiesel prepared. In a large-scale biodiesel facility, crude glycerol production can be on the order of millions of gallons per year. While biofuels are praised for their environmental benefits and economic viability, an increasing concern is what to do with the glycerol by-product. Moreover, as industrialized nations attempt to move from fossil fuels to more sustainable alternatives, there is an increasing global excess of crude glycerol.

It was estimated in 2007 that glycerol production in the United States averaged more than 350,000 tons per year, and European production of glycerol was estimated to be around 600,000 metric tons per year. This glycerol supply is also expected to continue to increase as Europe implements directives with mandatory minimum biofuel incorporation into retail fuel supplies. EU directive 2003/30/EC, for example, targets 5.75% biofuel incorporation to be achieved by the year 2010. In light of this growing glycerol supply, there is an on-going search for value added alternatives to disposal.

One alternative to disposal, particularly in association with biofuel production, is glycerol combustion as a heat source for the biofuel production process itself. Combustion of glycerol has been described as an elegant solution to the production of waste glycerol—if it worked well enough. Previous attempts to use waste glycerol as a heating fuel have had limited success and lacked true cost benefit. For example, there has been a long-standing fear that combustion of glycerol releases toxic acrolein gas unless carried out at a sufficiently high temperature. Moreover, scholars in the field have theorized that complete and clean combustion of glycerol by-product requires a burning temperature in excess of 1,000° C. and a relatively long mean residence time in the combustion chamber. Otherwise, effective combustion of glycerol generally requires combination with another fuel source, such as forming "logs" from glycerol and sawdust in a combustible container (e.g., an empty milk carton). Previous attempts to burn glycerol simply have not been able to overcome the safety and technical problems.

In light of the above, there remains a need in the art for viable alternatives to disposal of waste glycerol, such as glycerol by-product from biofuel production. The present invention solves this problem.

SUMMARY OF THE INVENTION

The present invention provides for the clean and efficient combustion of high viscosity, low heating value liquid fuels, such as glycerol. In particular, the invention provides a process for the combustion of glycerol, an apparatus for such combustion, and methods of recycling glycerol as a waste stream from a separate process to produce energy from the combustion of the glycerol. The produced energy can be recycled back into the original process that produced the glycerol or can be used for a secondary purpose, such as the production of electricity.

Accordingly, in one aspect, the invention is directed to a process for the combustion of a high viscosity, low heating value liquid fuel. The inventive method can be used with any liquid having a sufficiently high heating value to be a viable fuel source. In particular, the method can be used with any liquid fuel that has a sufficiently high viscosity and a sufficiently low heating value to hinder combustion in known liquid fuel burners. Glycerol is a particularly viable candidate for combustion according to the invention because of the inherent difficulties in sustainably burning a glycerol stream, the known limitations in the art around burning glycerol, and the increasing supply of waste glycerol, particularly arising from increasing production of biofuels.

In one embodiment, a process for the sustained combustion of a high viscosity, low heating value liquid fuel, such as glycerol, comprises the following steps: 1) providing a combustion apparatus with a combustion chamber; 2) heating the combustion chamber such that the temperature is at least about 370° C. prior to introduction of the high viscosity, low heating value liquid fuel into the combustion chamber; 3) providing the high viscosity, low heating value liquid fuel for introduction into the combustion chamber; 4) optionally treating the high viscosity, low heating value liquid fuel to reduce the viscosity thereof, 5) atomizing the high viscosity, low heating value liquid fuel for introduction into the combustion chamber; and 6) combining the atomized high viscosity, low heating value liquid fuel in the combustion chamber with air having a swirling velocity profile that creates a recirculation zone within the combustion chamber.

The inherent limitations on the efficient and sustainable combustion of high viscosity, low heating value liquid fuels, such as glycerol, make the choice of combustion apparatus particularly important. For example, the apparatus is preferably capable of sustained used at extreme temperatures (e.g., up to about 1,200° C.). Moreover, the apparatus preferably includes a combustion chamber that provides radiant and convective feedback heating (i.e., can reliably maintain its operating temperature).

Also because of the inherent limitations on burning glycerol (and similar liquids) the step of pre-heating the glycerol combustion chamber of the burner can be particularly important. In one embodiment, pre-heating the combustion chamber can comprise combustion of a pre-heating fuel source. Such pre-heating fuel source can be any fuel source that can effectively heat the combustion chamber, and that provides for easy transitioning from the pre-heating fuel source to the high viscosity, low heating value liquid fuel source. Non-limiting examples include kerosene, methane, and propane. In an alternate embodiment, the combustion chamber can be pre-heated using other methods, such as electrical resistance heating. Beneficially, the pre-heating fuel source only needs to be used on the initial start-up of the glycerol combustion apparatus. Once the desired combustion chamber temperature has been reached, the method allows for a transition to the glycerol fuel source. In some embodiments of the invention, the combustion method can be continuous and is only taken off-line periodically for maintenance. Thus, only limited amounts of pre-heating fuel may be needed according to the invention. Pre-heating is preferentially only carried out for a period of time sufficient to heat the combustion chamber to a temperature at least equal to the auto-ignition temperature of high viscosity, low heating value liquid fuel. In some embodiments, however, pre-heating can be used to reach an initial combustion chamber temperature of at least 600° C., at least 800° C., or even up to 1,000° C. After the desired temperature has been achieved, introduction of the pre-heating fuel can be discontinued and fully replaced with high viscosity, low heating value liquid fuel. The transition between the pre-heating fuel and the high viscosity, low heating value liquid fuel can be gradual or distinct.

In specific embodiments, the process includes the step of treating the high viscosity, low heating value liquid fuel to reduce the viscosity thereof, which can comprise reducing the viscosity of the liquid fuel to less than a specified viscosity. For example, it can be useful to reduce the viscosity of glycerol to less than about 20 centistokes (cSt). In specific embodiments, the step of treating the liquid fuel comprises heating. Again, using glycerol as an example, the glycerol can be particularly heated up to a temperature of at least 91° C., which is beneficial to reduce the glycerol viscosity to less than about 20 cSt. In another embodiment, the treating step comprises combining the high viscosity, low heating value liquid fuel with a viscosity-reducing liquid, which preferentially also is combustible.

The ability to achieve efficient and sustainable combustion of high viscosity, low heating value liquid fuels, such as glycerol, can be particularly dependent upon providing specific air flow characteristics in the combustion chamber. Accordingly, is some embodiments, the combining step of the inventive method can comprise providing an aerodynamically restricted air flow such that the atomized high viscosity, low heating value liquid fuel is introduced into the combustion chamber with a defined flow pattern and air mixture. In a specific embodiment, such aerodynamically restricted air flow is provided by a swirl component. For example, this can be achieved by providing air flow that is both axial and tangential to the flow of the high viscosity, low heating value liquid fuel. In specific embodiments, the air flow can be specifically controlled so as to have a calculable swirl number of about 5 or greater.

The method of the invention particularly recognizes the precise combination of conditions that must be met to achieve sustainable and efficient combustion of high viscosity, low heating value liquid fuels, such as glycerol. This requires a combustion apparatus having defined characteristics to achieve heat retention within the combustion chamber and maximize particle retention within the combustion chamber, precise pre-heating of the combustion chamber to establish sustainable combustion, and exacting controls over air flow and fuel flow to further sustain the combustion. The present invention recognizes the proper control of these variables, and other, necessary conditions to achieve efficient and sustainable combustion of high viscosity, low heating value liquid fuels, such as glycerol.

According to another aspect of the invention, the present invention provides a combustion apparatus that is particularly adapted for the combustion of a high viscosity, low heating value liquid fuel. In particular, the apparatus is useful for the combustion of a liquid fuel having an ambient viscosity of greater than 15 cSt and having a heating value in the range of about 10 MJ/kg to about 75 MJ/kg.

In one embodiment, an apparatus according to the invention comprises the following: 1) an outer shell defining the outer dimensions of the overall combustion apparatus; 2) a combustion chamber having an inner surface providing radiant and convective feedback heating, particularly at a combustion temperature in the range of about 600° C. to about 1,200° C.; 3) a central fuel tube for introduction of the high viscosity, low heating value liquid fuel into the combustion chamber, wherein the central fuel tube preferentially includes one or more components for heating or maintaining the liquid fuel within the central fuel tube at a defined temperature; 4) an atomizer apparatus attached to the central fuel tube for atomizing the high viscosity, low heating value liquid fuel prior to introduction thereof into the combustion chamber; and 5) a plurality of air ports positioned on the shell for providing an air flow into the combustion chamber that is one or both of axial and tangential to the flow of the liquid fuel through the central fuel tube.

In further embodiment, it may be useful to include additional components to the inventive apparatus. For example, the apparatus may further comprise an exhaust for venting the combustion chamber. In such embodiments, it may be preferable for the exhaust to comprise one or more components for limiting heat flow, air flow, or heat and air flow out of the combustion chamber. In specific embodiments, the exhaust may comprise a cap positioned centrally over the exhaust so as to provide an opening only around the periphery of the exhaust.

In further embodiments, the apparatus may comprise further components within the combustion chamber, within the exhaust section, or in both sections, that are useful for deflecting heat flow, air flow, or heat and air flow from the sides of the combustion chamber back toward the central portion of the combustion chamber. For example, in one embodiment, the apparatus comprises one or more air baffles, which can be metal plates extending horizontally from the wall of the combustion chamber or the exhaust section. A single baffle may extend complete around the inner circumference of the apparatus.

The inventive apparatus is particularly characterized by the various components used to increase necessary air flow to the combustion chamber, as well as maintaining proper heat and air circulation within the combustion chamber. For example, the apparatus may include one or more zonal restrictors that modify the inner geometry of the apparatus so as to form an expansion zone downstream from the atomizer. Such an expansion zone can be particularly useful to increase sustainability of the glycerol-fueled flame. All of the air flow directing components described above can be particularly beneficial to form a recirculation zone above the atomizer nozzle and within the combustion chamber that recirculates the atomized liquid fuel particles within the combustion chamber to improve total combustion of all fuel particles and minimize fuel particle losses through the exhaust.

The inventive apparatus can specifically include means for introducing a pre-heating fuel into the apparatus that is used to pre-heat the combustion chamber prior to onset of flow or the high viscosity, low heating value liquid fuel. For example, the pre-heating fuel could be provided through the same line as the high viscosity, low heating value liquid fuel. Alternately, the apparatus may comprise a second fuel tube for providing a pre-heating fuel separate from the supply tube for the high viscosity, low heating value liquid fuel. This is particularly useful when the pre-heating fuel is a liquid, such as kerosene. In still another embodiment, the apparatus may comprise one or more ports positioned on the shell for providing a pre-heating fuel. Particularly, the pre-heating fuel ports may be positioned to be upstream from the atomizer. This configuration is particularly beneficial when the pre-heating fuel is a gas, such as propane.

It is also particularly beneficial for the apparatus to include means for directing the high viscosity, low heating value liquid fuel into the combustion chamber. In particular, such means should be useful to provide the liquid in a very fine mist of uniform droplet size. In preferred embodiments, the apparatus comprises an atomizer apparatus that is particularly designed to handle higher viscosity liquids. In one particular embodiment, the atomizer apparatus is a siphon type air atomizer nozzle.

It can also be useful to further heat the high viscosity, low heating value liquid fuel to reduce the viscosity thereof prior to atomization. For example, the inventive apparatus may comprise a separate heater apparatus for heating the high viscosity, low heating value liquid fuel prior to introduction into central fuel tube. Likewise, the apparatus may further comprise a pump for pumping the high viscosity, low heating value liquid fuel through the central fuel tube. Generally, it is preferred that the apparatus according to the invention comprise the various structural components needed to enable one to successfully carry out the various methods according to the invention.

According to still another aspect, the invention provides a method for recycling waste glycerol for heat production. The waste glycerol can be obtained from any source, such as an industrial process (e.g., a biofuel production process). Likewise, the energy produced in the method can be used for any purpose. This aspect of the invention is particularly beneficial in that the recycling process can be placed directly in-line with a separate process that produces glycerol as a waste stream. The glycerol waste stream can be directed into the inventive glycerol recycling process and burned to produce energy, which can be directed back into the original process, such as in the form of necessary process heating. For example, some biofuel production processes can require the input of heat to facilitate various reactions. Since glycerol is a by-product of many biofuel production processes, the present invention allows for complete reversal of the disadvantages of producing waste glycerol. Specifically, rather than incurring a cost to dispose of the waste glycerol, the biofuel producer can recycle the waste glycerol using the present methods to produce the heat needed to run the biofuel production process. Thus, rather than incurring disposal costs, the biofuel producer increases the efficiency of the production process and reduces the overall cost of producing the biofuel. Moreover, this can be considered a continuous process since the waste glycerol can continuously be removed from the biofuel process as a waste stream, moved directly into the glycerol combustion process, and the produced energy can be continuously sent directly back to the biofuel production process. It is understood that when the glycerol combustion process is brought on-line, an initial start-up of the process can require additional steps, such as pre-heating the combustion apparatus, that would not otherwise be required in the normal, continuous use of the glycerol combustion method in recycling a continuously provided glycerol waste stream.

In one embodiment, the method of recycling waste glycerol comprises the following steps: carrying out a process that forms a glycerol stream as a reaction by-product; withdrawing the glycerol stream for use as a glycerol source in a glycerol combustion process as described herein; and combusting the glycerol to produce energy (e.g., heat). The energy produced by combusting the glycerol can be recovered and used for a variety of purposes. In certain embodiments, the method further comprises using the energy produced by the glycerol combustion to provide at least a portion of the reaction energy needed for carrying out a separate process. In one specific embodiment, the production process forming a by-product glycerol stream comprises a biofuel production process. In other embodiments, the separate process in which the produced energy is used is a biofuel production process. For example, the biofuel production process may require reaction heating, and the step of using the energy from the glycerol combustion can comprise using the produced energy in the biofuel production process. In another embodiment, the step of using the energy produced by the glycerol combustion comprises using heat from the combustion to produce electricity.

BRIEF DESCRIPTION OF THE DRAWINGS

Figure 1A:
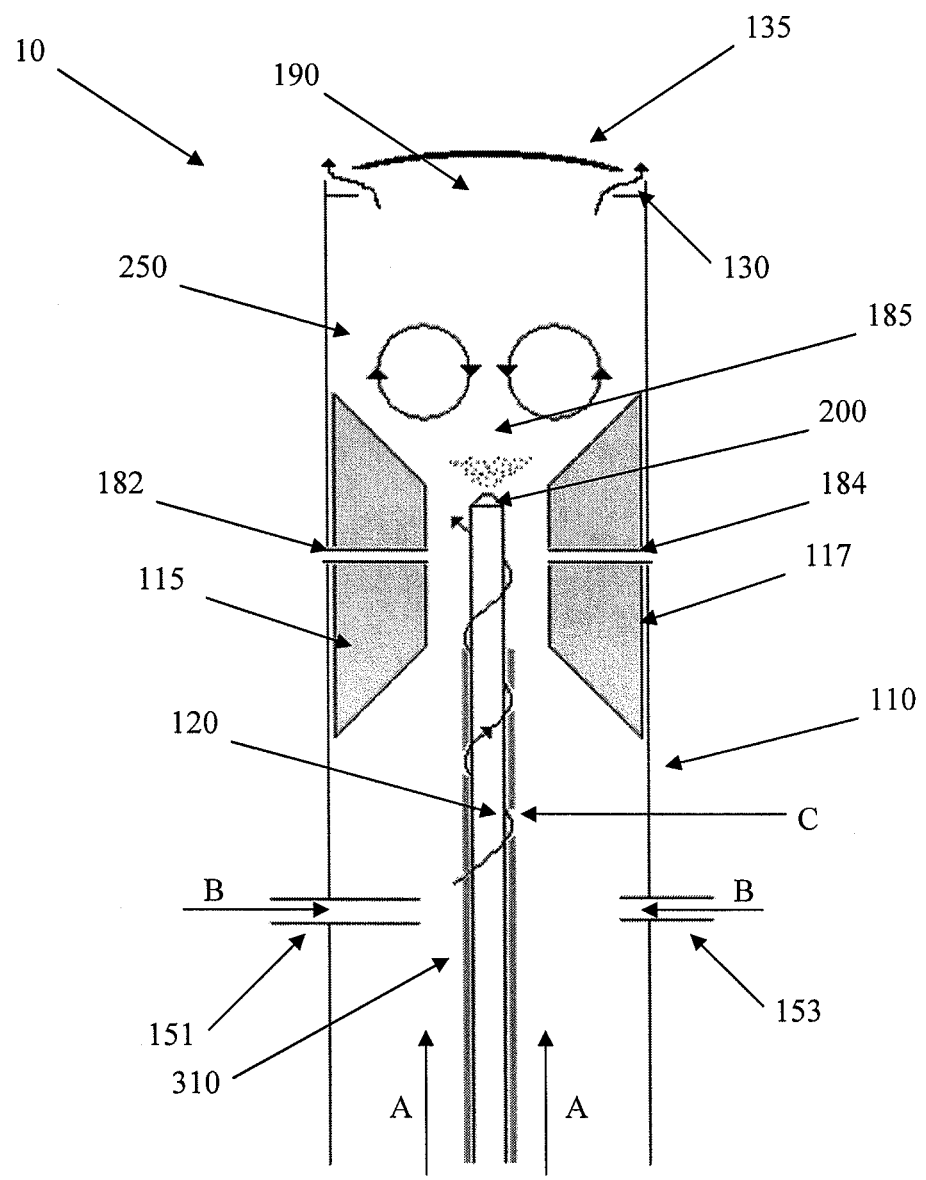
Figure 1B:
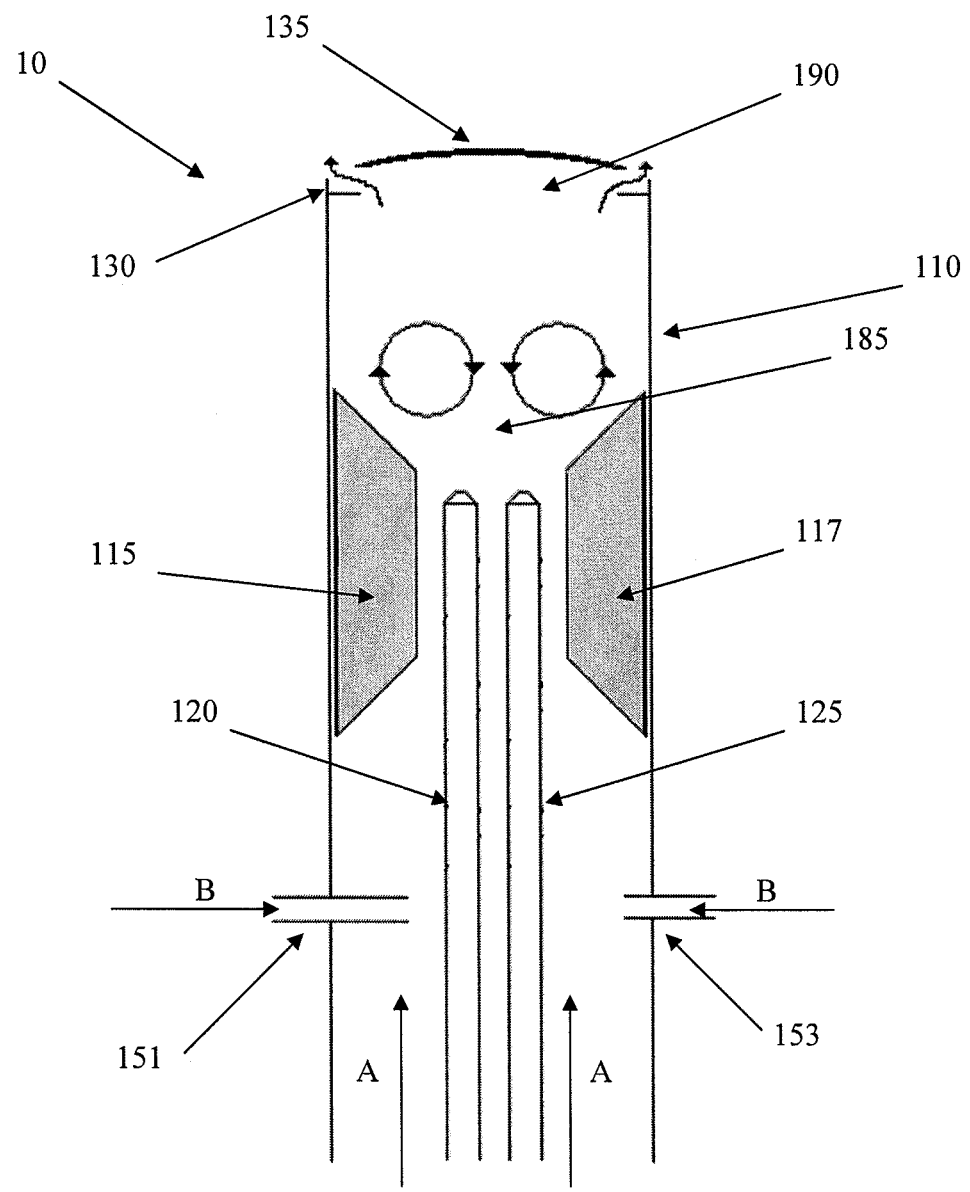
Figure 1C:
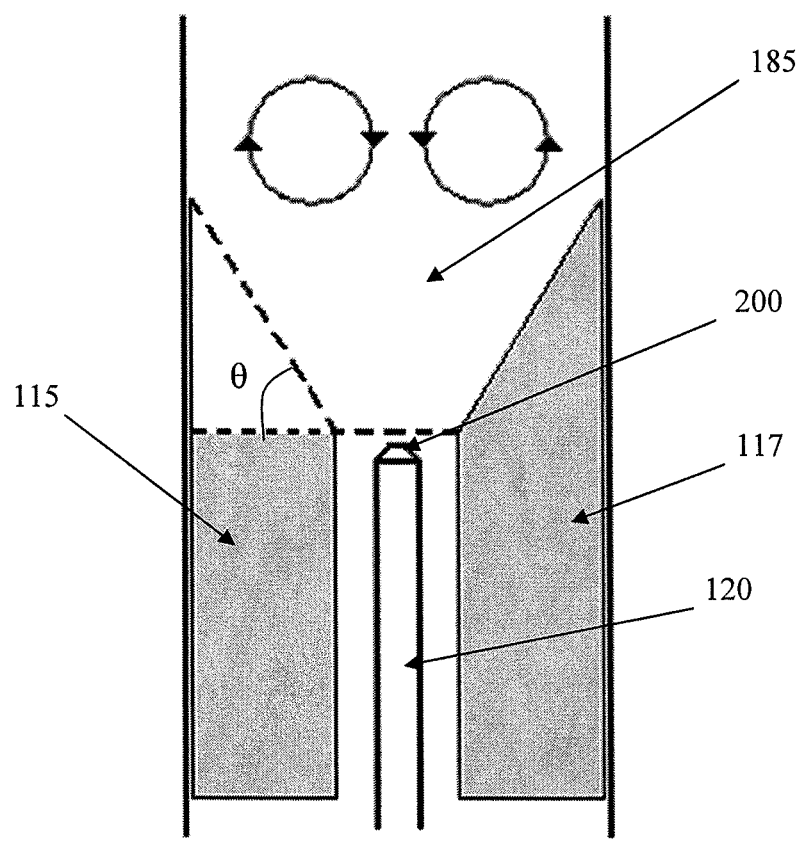
Figure 2:
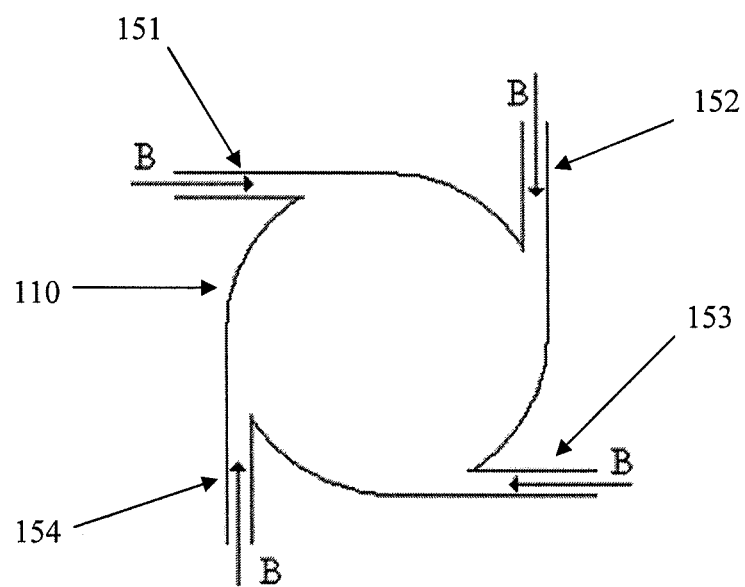
Figure 3:
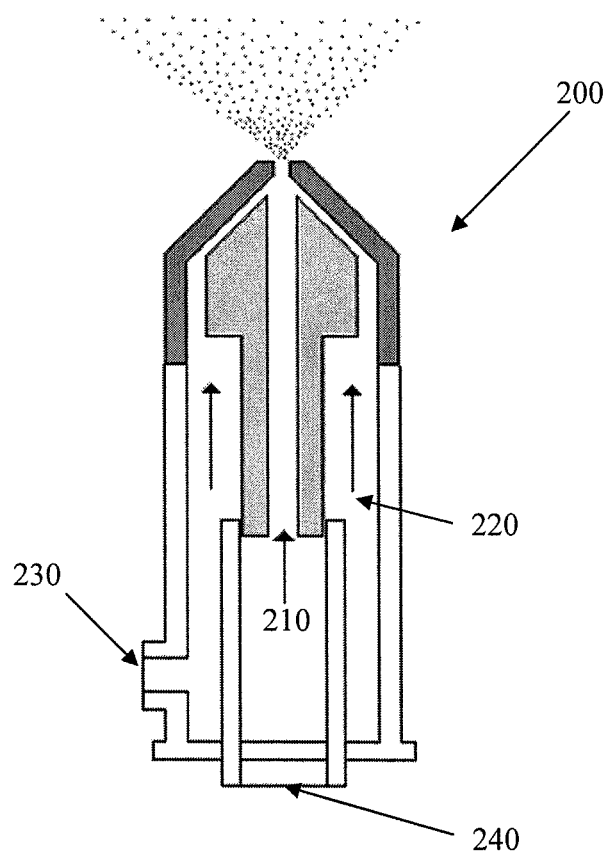
Figure 4:
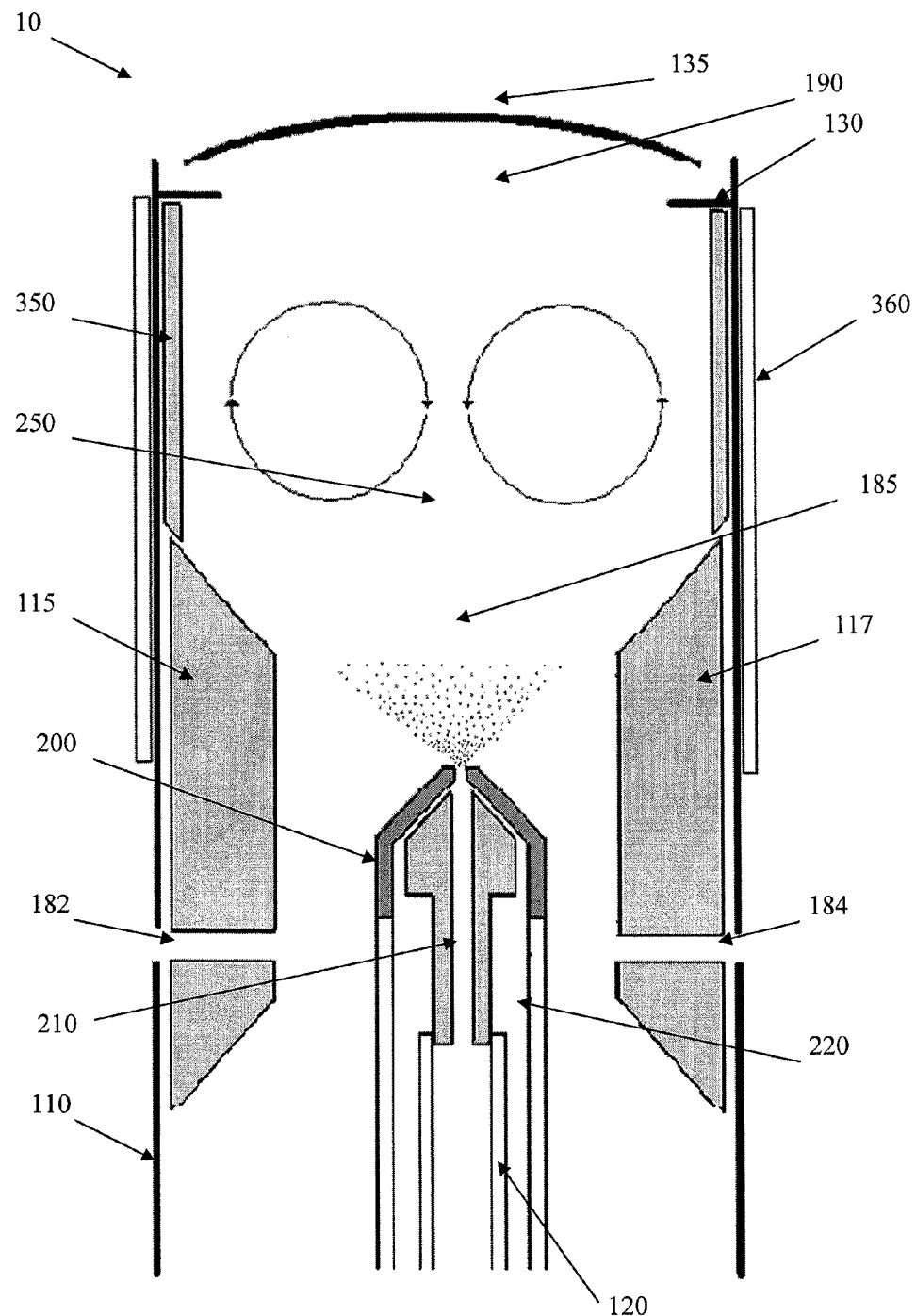
Figure 5:
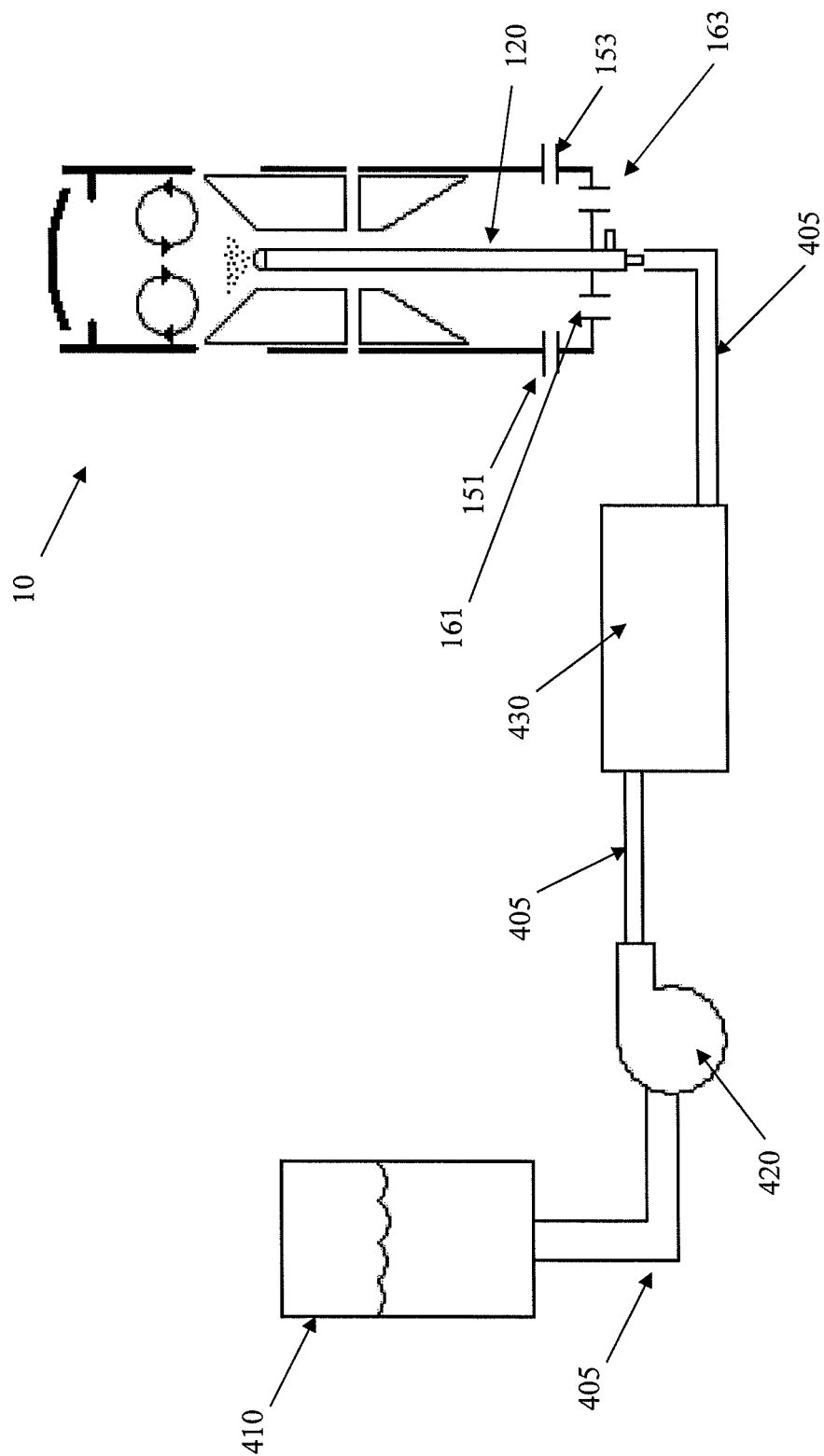

Having thus described the invention in general terms, reference will now be made to the accompanying drawings, which are not necessarily drawn to scale, and wherein:

FIG. 1A is a side view cross-section of a combustion apparatus according to one embodiment of the invention;

FIG. 1B is a side view cross-section of a combustion apparatus according to another embodiment of the invention;

FIG. 1C is a detail view of the combustion chamber of a combustion apparatus according to the invention illustrating the zonal restriction for facilitating recirculation;

FIG. 2 is a top view cross-section of a combustion apparatus according to one embodiment of the invention specifically illustrating the tangential air flow provided through side ports;

FIG. 3 is a side view cross-section of an atomizing nozzle useful according to one embodiment of the invention;

FIG. 4 is a side view cross-section of a combustion apparatus according to another embodiment of the invention providing a detailed view of the combustion chamber; and FIG. 5 is a schematic view of a combustion apparatus according to one embodiment of the invention including additional components useful in delivering a liquid fuel to the combustion apparatus for combustion.

DETAILED DESCRIPTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Many industrial processes require the addition of heat to carry out various reactions, and the necessity of providing this heat source often drives up the cost of otherwise economical processes. Thus, the production of many useful products can become economically unviable simply because of the associated processing costs, such as heating to drive a reaction. Likewise, many industrial processes, in addition to a desired product, often produce a sizeable amount of reaction by-products. In some reactions, useful by-products are produced; however, in other reactions, the by-products can lack alternative uses or can be harmful or toxic. Even where the reaction by-products are useful, the by-products may require extensive processing or purification for market entry, thus reducing the true marketability of the by-products. Many processes for the preparation of biofuels present an interesting hybrid of the above challenges.

As previously pointed out, transesterification of vegetable oils (both virgin and waste) to prepare biodiesel typically produces a relatively large stream of waste glycerol. Further, the preparation process generally requires at least mild heating of the vegetable oil (such as to a temperature of at least about 40° C.), and the heat necessary to carry out the biofuel production process typically increases with the scale of the process.

Similarly, processes for the production of biofuel from animal fats also require reaction heating and produces glycerol as a reaction by-product. The production of biofuels (such as jet fuel, diesel, and gasoline) from a biomass fuel-stock (such as animal fats) comprises, in part, the hydrolytic conversion of triglycerides in the biomass fuelstock to free fatty acids. For example, the CENTIA™ process of DIVERSIFIED ENERGY® Corporation is a process for the production of fuels from biomass feedstocks that results in the production of glycerol as a by-product. Conversion of a biomass feedstock can comprise heating in the presence of water to approximately 250° C. to sever the bonds in the triglyceride molecule between the fatty acid chains and the glycerol backbone, which generally results in a product mixture of free fatty acids and glycerol.

In light of the ever increasing desire for more environmentally favorable and renewable fuel sources, overcoming the production challenges associated with the above biofuel preparation processes, including providing a cheap and efficient fuel source useful for reaction heating, as well as disposition of glycerol by-product, would be highly beneficial. Until the present invention, however, it has not been known how to simultaneously dispose of waste glycerol while cleanly and efficiently providing an energy source.

The present invention also provides for the use of glycerol as a fuel source in applications other than biofuel production. Pure or waste glycerol can be used as a fuel source in any reaction where energy generation is useful. Accordingly, the present invention provides methods of providing energy to reactions in any industrial process. Moreover, the energy generated according to the methods of the present can be used as an alternative energy source for power production. For example, glycerol combustion could be used to drive a heat engine in the production of electricity.

Reaction heating in industrial processes is typically provided by fuel combustion, such as in standard fuel oil burner. Desirable fuels for heating are both economical and provide a suitable heat of combustion, or enthalpy. Waste glycerol produced as a by-product of a reaction process can be an economical source of heating fuel for multiple reasons: a) glycerol is produced at the point of use as a waste product, can thus be considered a "free" fuel source, and avoids the need to transport fuel to the industrial site; b) use of the by-product glycerol as a fuel overcomes the need to dispose of the waste material; c) and glycerol has a suitable heat of combustion for use in reaction heating. Until now, glycerol has not been a viable option as a fuel source for industrial process, even where it is produced as a by-product, because glycerol is not easily combustible. The present invention overcomes this problem.

Combustion of glycerol generally proceeds according to the reaction provided below, $$C_3H_5(OH)_3 + 3.5O_2 \rightarrow 3CO_2 + 4H_2O + \text{heat}$$

and the heat of combustion is approximately 16 MJ/kg of glycerol. Thus, it is clear that combustion of glycerol requires provision of the glycerol itself, as well as a combustion-sustaining amount of oxygen (often supplied from ambient air). The prior art, however, has heretofore failed to recognize the combination of variables that must be established to achieve the clean and efficient combustion of glycerol and thus provide the ability to both directly withdraw glycerol as a side-stream of an industrial process and use the glycerol by-product as a fuel source for generating heat.

Attempts to combust glycerol using a standard fuel burning apparatus, such as a kerosene heater, have proven unsuccessful, even when trying to burn the glycerol using a continuous spark ignition source. In fact, glycerol does not evenly and efficiently combust even in the presence of a sustained flame. This is illustrated by placing a propane torch into a glycerol spray. The glycerol in the immediate vicinity of the propane-fed flame will burn, but there is incomplete combustion of the entire glycerol spray, and glycerol burn is not self-sustaining after removal of the propane-fed torch. Such a method of burning glycerol is also potentially hazardous because of the presence of localized variations in the glycerol flowfield where the glycerol is above its thermal decomposition temperature but below its auto-ignition temperature. Such an environment can result in the formation of undesirable species, such as acrolein.

Acrolein is a known thermal decomposition product of glycerol when heated above 280° C. It is toxic at very low concentrations (e.g., about 2 ppm), and some studies have suggested human health hazards at concentrations as low as 0.09 ppm. Because acrolein is dangerous at such low concentrations, most biodiesel producers have been advised not to attempt burning glycerol. Acrolein, however, is increasingly unstable at high temperatures, and the compound itself is highly flammable. Accordingly, efficient combustion of glycerol, such as according to the present invention, can actually consume any acrolein that may be produced before the combustion gasses are exhausted to the environment.

Generally, a standard fuel oil burner cannot easily combust glycerol due to the high viscosity of the material. Likewise, the relatively high auto-ignition temperature of glycerol also reduces the ability to combust in a standard oil burner. Previous attempts at burning glycerol have illustrated the associated difficulties. For example, many burners do not burn at a sufficiently high temperature to maintain combustion, which results in formation of sticky residues that can clog the burner and self-extinguish the combustion.

These problems are echoed by numerous individuals who have turned to personal production of biodiesel to offset increasing fuel costs and promote the use of renewable resources as fuel stocks. The growing biodiesel movement has recognized that dealing with waste glycerol can be particularly problematic. One need only browse a biodiesel web forum to learn of the difficulties many individuals have faced with trying to burn waste glycerol. Reports of attempts to combust glycerol indicate it is extremely difficult to burn, leaves a residual rubbery mass in the burner, and may only be burned in a secondary combustion relying on heat from the primary combustion of biodiesel. In other words, it has heretofore been impossible to combust glycerol as a self-sustaining fuel source.

In contrast to the problems known in the industry for dealing with waste glycerol, the present invention provides a suitable process for the sustainable, clean, and efficient combustion of glycerol. In particular, glycerol combustion according to the present invention recognizes the precise control of numerous variables necessary to achieve clean and efficient combustion of glycerol, including the following:

1) use of an apparatus comprising a suitable glycerol combustion chamber;
2) properly heating the combustion chamber to allow for glycerol combustion and sustained burn;
3) introduction of the glycerol into the combustion chamber in a state designed to maximize combustibility of the glycerol; and
4) provision of air via a route also designed to maximize combustibility of the glycerol.

Although burning a substance would appear, on the surface, to be a simple matter, the present invention arose from the understanding that although a substance may be present in an abundance and may a desirable fuel source, actual use of the substance as a self-sustaining fuel source goes well beyond simply placing the substance in the vicinity of a flame—even a very hot flame. Rather, clean and efficient combustion of glycerol in a sustained manner proved to required extensive development and precise control of the numerous variables described above.

In particular, there are three hurdles to achieving sustained combustion of glycerol that the known art has failed to appreciate or solve: 1) glycerol has a low heating value; 2) glycerol is highly viscous; and 3) glycerol has a very high auto-ignition temperature. It is only according to the present invention that a combination of methods has been achieved to address and overcome each of these problems. Specifically, the high auto-ignition temperature is overcome through proper heating of the combustion apparatus prior to introduction of the glycerol. The high viscosity problem may be overcome by using appropriate means to sufficiently lower the viscosity or using proper equipment to provide the necessary atomization of the highly viscous material. The low heating value problem is by creating complex flowfield and thermal feedback conditions within the combustion apparatus. The following disclosure more particularly describes the specific conditions required to achieve sustained, efficient combustion of high viscosity liquid fuel sources, such as glycerol.

The present invention may particularly be described herein in relation to glycerol. It should be understood, however, that the invention is not so limited. Rather, the processes and apparatus of the present invention can be extended to multiple further materials characterized by having a heat of combustion suitable for use as a fuel source but having limited combustibility arising from one or more physical properties (e.g., fuels that exhibit one or more of a high viscosity, high auto-ignition temperature, or low heat of combustion), as more fully described herein. For example, other polyols could likewise by used according to the present invention. Glycerol is simply described as a preferred embodiment. In certain embodiments, the invention can be characterized as being directed to any liquid fuel having an ambient viscosity of greater than 15 cSt, greater than 20 cSt, greater than 30 cSt, greater than 40 cSt, greater than 50 cSt, greater than 60 cSt, greater than 70 cSt, greater than 80 cSt, greater than 90 cSt, greater than 100 cSt, greater than 125 cSt, greater than 150 cSt, greater than 175 cSt, greater than 200 cSt, greater than 250 cSt, greater than 300 cSt, greater than 350 cSt, greater than 400 cSt, greater than 450 cSt, or greater than 500 cSt. As used herein, the term ambient viscosity is intended viscosity at a temperature of 20° C. and a pressure of 1 atm.

In other embodiments, the inventive methods can be used with any liquid material characterized as having a low heating value. In particular, the method could be used with any liquid material having a heating value in the range of about 10 MJ/kg to about 75 MJ/kg, about 12 MJ/kg to about 60 MJ/kg, about 15 MJ/kg to about 50 MJ/kg, about 12 MJ/kg to about 50 MJ/kg, about 12 MJ/kg to about 40 MJ/kg, or about 12 MJ/kg to about 30 MJ/kg. Thus, the term "low heating value" liquid fuel refers to any liquid fuel having a heating value in the above ranges.

Initializing and Maintaining Proper Heating of Combustion Environment

Many liquid fuel burners work by spraying a fine mist of the fuel (e.g., kerosene) into a combustion zone in the presence of oxygen and in the area of an igniter (e.g., a flame or sparking means). However, glycerol that is simply sprayed into a combustion zone in the presence of oxygen fails to ignite. Even with a blowtorch flame placed directly in the middle of a glycerol spray, the glycerol will smoke but not ignite into a sustainable flame. Glycerol has an auto-ignition temperature of about 370° C. (698° F.). By comparison, the auto-ignition temperature of common fuels are as follows: gasoline (280° C.); kerosene (210° C.); and standard fuel oils (about 210° to about 260° C.). Although not wishing to be bound by theory, this high auto-ignition temperature for glycerol (relative to known fuels), coupled with the low heating value of glycerol, is believed to lead to the inability to ignite and sustain a glycerol flame by typical means.

It is clear from the above that introduction of glycerol into a "cold" burner is ineffective, and the glycerol will simply fail to combust. It has been found according to the present invention, however, that glycerol combustion can be greatly facilitated by introducing the glycerol into a combustion chamber that is heated well above ambient conditions. Accordingly, in certain embodiments, it is useful to pre-heat the combustion chamber of the apparatus used to burn the liquid fuel.

Pre-heating of the glycerol combustion chamber can be by any means capable of achieving a temperature useful to facilitate sustainable clean and efficient glycerol combustion. In particular embodiments, pre-heating may be carried out by introduction of a pre-heating fuel source that is recognized as being easily combustible. Preferably, the pre-heating fuel source is introduced in the absence of glycerol. For example, pre-heating may be achieved by introduction of a pre-heating fuel comprising kerosene, propane, methane, or any other conventional hydrocarbon fuel into the glycerol combustion chamber. In preferred embodiments, the pre-heating fuel comprises a fuel that is gaseous at ambient conditions. Such materials are beneficial because they can be injected directly into the throat of the combustion apparatus. However, liquid fuels are beneficial, particularly in light of their likely greater availability. Liquid pre-heating fuels can be pumped through the same nozzle as the glycerol. For example, proper plumbing could be employed to allow both the pre-heating fuel and the glycerol to flow to the atomization nozzle.

Pre-heating of the glycerol combustion chamber preferably continues until the chamber has reached a temperature suitable for sustainable, clean, and efficient glycerol combustion. Preferably, pre-heating is carried out until the combustion chamber has reached the auto-ignition temperature of the liquid fuel being used. In certain embodiments, pre-heating is carried out until the combustion chamber has achieved a temperature of at least about 370° C. Preferably, pre-heating is carried out until achieving a temperature of at least about 400° C., at least about 450° C., at least about 500° C., at least about 550° C., at least about 600° C., at least about 650° C., at least about 700° C., at least about 750° C., at least about 800° C., at least about 850° C., at least about 900° C., or at least about 950° C. The above temperatures are based on combustion at ambient pressure, and it is understood that the above temperatures may be reduced if the combustion conditions include pressures above ambient.

As previously noted, glycerol combustion cannot be sustained at temperatures less than the auto-ignition temperature of glycerol. This is generally true in the combustion of any fuel/oxidizer mixture. Glycerol combustion, though, is further hindered by its inherently low heating value (about 16 MJ/kg), which is one-third the heating value of typical hydrocarbon fuels. The heating value of a fuel is typically defined as the amount of heat released by a specified quantity of a material once the material is combusted and the combustion products have returned to the base temperature (generally 25° C.). Natural gas and propane have heating values of about 42 MJ/kg and about 48 MJ/kg, respectively. Such materials are good self-sustaining combustibles because the combustion of the material releases sufficient quantities of heat to easily maintain the temperature around the combustion zone above the auto-ignition temperature of the material. Because of the relatively low heating value of glycerol, however, if the temperature of the combustion zone is close to the auto-ignition temperature of the glycerol, the combustion may not provide sufficient heat to maintain combustion. Thus, it is highly advantageous to have a large thermal reservoir to maintain glycerol combustion. Preferably, the glycerol combustion thermal reservoir is maintained at temperatures well above the auto-ignition temperature of glycerol to sustain combustion thereof. Typically, higher temperatures within the combustion chamber favor cleaner and more efficient glycerol combustion. Specifically, a higher thermal reservoir makes the combustion flame more tolerant to perturbations in flow rates or other disturbances associated with combustion, which are further described below. This can be true with any high viscosity liquid fuel that may be used according to the invention. In specific embodiments, it may thus be useful to pre-heat the combustion chamber to a temperature that exceed the auto-ignition temperature of the high viscosity liquid fuel by at least about 50° C., at least about 100° C., at least about 200° C., at least about 300° C., at least about 400° C., or at least about 500° C.

Once a suitable temperature in the combustion chamber has been achieved, it is possible to switch over from the pre-heating fuel source to the glycerol. This transition between fuel sources can be gradual or distinct. For example, the pre-heating fuel source could be used until the glycerol combustion chamber has reached the final desired temperature, at which time flow of the pre-heating fuel source is stopped and flow of the glycerol source is started. Of course, there should be sufficient overlap in the introduction of the fuel sources so that combustion in the glycerol combustion chamber is not interrupted. In another embodiment, the transition can be more gradual. For example, the flow of the pre-heating fuel source could be gradually decreased while the flow of the glycerol source is gradually increased such that the fuel source, for a defined time period, comprises both the pre-heating fuel source and the glycerol fuel source, the pre-heating fuel content being gradually decreased while the glycerol content is gradually increased. In these embodiments, it is possible to begin introduction of the glycerol fuel source while the glycerol combustion chamber is at a lower temperature, and the continued presence of the pre-heating fuel allows for the continued pre-heating of the glycerol combustion chamber prior to completely discontinuing the pre-heating fuel source.

When a pre-heating fuel is used for pre-heating the glycerol combustion chamber, it is desirable to have precise controls over the timing and flow of the pre-heating fuel and the glycerol. In some embodiments, the pre-heating fuel and the glycerol may be provided through the same nozzle. For example, when using an atomizer nozzle, such as described more fully below, glycerol could be supplied through a central line, and the pre-heating fuel could be provide through the axial air flow line. Once a sufficient pre-heating has been completed, the pre-heating fuel could be replaced with air flow alone. In particular embodiments, the pre-heating fuel is controlled independently from the glycerol supply, and both fuels preferably have dedicated ports for introduction of the material into the burner. For example, two central lines could be provided, one for the glycerol and one for the pre-heating fuel. Moreover, the mode of delivery of the pre-heating fuel can be varied depending upon the type of fuel used. In some embodiments, the pre-heating fuel can be delivered through ports formed in the sides of the combustion apparatus, preferably at some point up stream from the combustion chamber and/or upstream from the nozzle where the glycerol is atomized into the combustion chamber.

In other embodiments, pre-heating of the glycerol combustion chamber can be carried using other heating methods. In fact, any method recognized in the art as useful for heating a combustion chamber to a defined temperature can be used. For example, in one embodiment, pre-heating can be carried out using electric resistance heating, which offers precise control and direct heating for various applications. Direct resistance heating can be used for heating any electrically conductive material. Moreover, any material, either solid or liquid, can be heated using an encased resistance heater. An encased resistance heater typically comprises an electric resistance element surrounded by an electrical insulator enclosed in an outer envelope. The outer covering provides mechanical and chemical protection. The heater is placed on or in the solid, liquid, or vapor to be heated, and heat generated by current flow through the resistance element is transferred to the workpiece by convection and conduction.

Electric induction heating can also be used. In this method, a high-frequency current in a winding around the housing induces eddy currents in the ferrous housing, causing rapid heating to occur.

In certain embodiments, a combustion chamber temperature favorable for sustained glycerol combustion is in the range of about 600° C. to about 1,200° C., about 650° C. to about 1,150° C., about 700° C. to about 1,100° C., about 750° C. to about 1,050° C., or about 800° C. to about 1,000° C. Accordingly, it is not only desirable to pre-heat the combustion chamber, as described above, but it is also desirable to maintain the thermal reservoir after pre-heating has ceased such that the noted combustion chamber temperature is maintained. It has been found according to the present invention that by first establishing a combustion chamber temperature having a very great thermal reservoir beyond the auto-ignition temperature of the glycerol (or other liquid fuel having a relatively low heating value), combustion of the glycerol can be more reliably maintained, as the heat produced by the glycerol combustion is sufficient to maintain the excessive thermal reservoir. Accordingly, the combustion chamber temperature ranges provided above can be referred to as the combustion chamber temperatures required to provide self-sustaining combustion for the glycerol (i.e., a "glycerol self-sustaining combustion temperature range"). Of course, as further described, achieving this temperature range can be only one factor in achieving true, sustained glycerol combustion according to the invention.

To ensure the combustion chamber is kept in the glycerol self-sustaining combustion temperature range, it is beneficial for the transition between pre-heating fuel and glycerol to be relatively seamless. In other words, there should be little or no time between discontinuation of pre-heating fuel and start of glycerol flow that would allow the combustion chamber to significantly cool. Thus, it is useful for the glycerol flow to be ready for immediate spray into the combustion chamber once the desired pre-heating of the chamber is achieved.

Further to the above, it can be particularly desirable according to the invention to provide a burner having a glycerol combustion chamber with a construction designed to maximize sustained glycerol combustion. For example, it has been realized according to the present invention that even after initial pre-heating of the glycerol combustion chamber, introduction of glycerol as a fuel source can actually lower the combustion chamber temperature. In one test, a combustion chamber formed of chimney pipe was pre-heated with kerosene to a temperature between about 800° C. and about 1,000° C. When glycerol began spraying into the combustion chamber flame, however, the temperature of the chamber (monitored by thermocouples) would begin to drop, and after the temperature dropped below about 600° C., combustion ceased. Thus, it was apparent that providing a pre-heated environment is useful to facilitate glycerol combustion, but the evaporation and ignition of the glycerol droplets can actually remove energy from the overall system.

To overcome this problem, the present invention has revealed that sustained glycerol combustion can particularly benefit from the use of one or more heat sustaining methods or structures. For example, glycerol combustion can be carried out in an insulated metal chimney, which provides radiant and convective feedback heating. Other types of burner construction can also be used to provide such heating. For example, a ceramic lining may be employed to increase the radiant heat feedback into the glycerol combustion chamber. In another embodiment, it is possible to use reflective material on the interior surface of the combustion chamber to facilitate thermal radiative heat transfer between the burner walls and the reactants.

In still further embodiments, it is desirable to at least partially restrict the exhaust from the combustion chamber such as by partially covering the exhaust opening of the combustion chamber. For example, a metal plate can be employed at the exhaust opening to at least partially enclose the flame zone and enhance recirculation of heat, air, and combustibles (e.g., fuel particles) within the combustion chamber. Any type of flow obstruction can be used to increase the residence time of each fuel particle inside the hottest section of the combustion chamber. Such obstruction increases the chance that each fuel particle will burn completely and transfer heat back to the incoming, evaporating glycerol before being exhausted from the chamber. As more fully described below, the apparatus can employ a number of air flow directing components to provide for recirculation of heat, air, and combustibles within the combustion chamber, thus forming a beneficial recirculation zone within the chamber that maximizes residence time of all necessary combustion components within the combustion chamber.

Moreover, as combustion is carried out in the presence of introduced air, it is preferred for the combustion chamber to be formed and arranged to maximize convective heat feedback into the glycerol combustion chamber. Thus, it is not favorable to have a straight air flow through the burner from the point of air introduction to the exhaust or ventilation point. Rather, it is desirable for the burner to provide for re-circulation of a heat transfer medium, such as air.

As more fully described below, it is particularly useful for the combustion apparatus to be designed to maximize air swirl within the combustion chamber. Although not wishing to be bound by theory, proper swirl induction is believed to play a key role in light of the conversion to axial vorticity by expansion within the combustion chamber. This axial vorticity dramatically increases the residence time of the glycerol within the combustion chamber returning hot products and radicals to the primary combustion zone, thereby allowing for complete combustion of this low heating value fuel.

Minimizing heat loss through ventilation maximizes the heat sustained in the glycerol combustion chamber, and this facilitates maintenance of a temperature within the glycerol combustion chamber that exceeds the auto-ignition temperature of the glycerol. Further, maintaining the increased temperature provides for a "cleaner" burn of the glycerol that avoids choking of the burner and production of other materials that may eventually clog the burner and require a shutdown of the system for cleaning. Various aerodynamic obstructions can be placed in the combustion apparatus to increase residence time and thermal feedback to the reactants in the combustion chamber, thus ensuring complete combustion of the glycerol. Thus, the apparatus can include a number of air flow directing components, such as an exhaust cap, air baffles, and zonal restrictors. Moreover, the shell of the combustion apparatus itself may be shaped to beneficially direct heat and air currents. Methods of maximizing thermal feedback can also include the method of air introduction into the combustion chamber, which is more fully described below.

Discontinuation of glycerol combustion is preferably avoided because of the associated need to again pre-heat the burner before resuming glycerol combustion. Rather, the present invention is particularly characterized in that it is especially amenable to use in a continuous process, such as a biofuel production line. Accordingly, in one embodiment, it is possible to directly insert the glycerol combustion process into an overall biofuel production process so that waste glycerol is directly withdrawn from the biofuel production line and directed to the glycerol combustion apparatus where it is burned to produce heat that is used to facilitate reactions in the biofuel production process. Once the glycerol burner has been initially pre-heated, the burner can run solely on glycerol as a fuel source. Thus, pre-heating is only an initialization step in the present process that is only carried out on start-up of the process. Of course, if desirable, other fuels could be mixed with glycerol at any time during the glycerol combustion. However, the present invention is particularly beneficial in that glycerol by itself can be used as the sole fuel source for a self-sustaining combustion.

Preparing the Liquid Fuel for Combustion

Methods of glycerol combustion according to the invention can comprise carrying out one or more steps prior to introducing the glycerol into a combustion chamber. In particular, the methods may comprise treating the glycerol in some manner to prepare the glycerol for combustion.

Efficient, sustainable glycerol combustion is particularly hindered by the high viscosity of the substance. Effective combustion of a material typically requires atomization of the material to form a fine spray or mist. Conventional atomization devices, such as pressure-atomized nozzles, are limited by the viscosity of a substance that may be atomized. Pure (100%) glycerol has a viscosity of about 650 centistokes (cSt) at 20° C. and about 175 cSt at 38° C. By comparison, kerosene has a viscosity at 20° C. of about 2.7 cSt, water has a viscosity of about 1 cSt, and gasoline has a viscosity of about 0.4 to 0.9 cSt. The high viscosity of glycerol thus makes it difficult to introduce the glycerol into the combustion chamber in an atomized state amenable to efficient combustion (i.e., a fine spray of small, uniform droplets). Accordingly, the invention may include treating the glycerol (or other high viscosity liquid fuel) to reduce its viscosity.

In certain embodiments, the glycerol may be treated to reduce the viscosity thereof to a point allowing for atomization of the glycerol using conventional atomization devices. In particular, the glycerol may be treated such that the viscosity is reduced to less than about 60 cSt, less than about 50 cSt, less than about 40 cSt, less than about 30 cSt, less than about 25 cSt, or less than about 20 cSt. When using a standard pressure-atomization nozzle, it is particularly preferred for the viscosity of the glycerol to be reduced to less than about 20 cSt, less than about 16 cSt, or less than about 14 cSt.

Any treatment useful for sufficiently decreasing the viscosity of the glycerol can be used according to these embodiments of the invention. For example, the glycerol could be combined with an additional liquid useful for decreasing the overall viscosity of the mixture without hindering the combustibility of the glycerol. Preferably, the liquid for admixture with the glycerol is also useful for increasing the combustibility of the glycerol. In certain embodiments, the liquid for admixture comprises a material that is polar in nature. In one embodiment, the glycerol can be mixed with compounds, such as methanol, ethanol, or other alcohols. If mixing is to be with a non-polar material, such as typical hydrocarbon fuels, it may be useful to further include a surfactant or other material useful to facilitate admixture of polar and non-polar materials. Such a mixture can also be useful in situations where the glycerol is being produced as a waste by-product of an industrial process (such as biofuel production) and the amount of waste glycerol being produced in insufficient to meet all heating requirements of the industrial process. An extender material could then be added to the glycerol to extend the glycerol supply to a sufficient quantity to meet the heating requirements of the industrial process while also sufficiently reducing the glycerol viscosity to allow for proper atomization at the point of combustion.

Surprisingly, it has been found according to the present invention that glycerol can even be efficiently and sustainably burned when combined with a substantial volume of water. Waste glycerol from biofuel production processes often contains a certain content of water. While the water may be separated from the glycerol, according to the present invention, the water could be left in the glycerol to function as a viscosity reducer. Moreover, water could be added to glycerol to treat the glycerol and effectively reduce the viscosity thereof. Testing according to the invention has shown that water can be combined with glycerol at a concentration up to about 30% by volume before affecting combustion. Thus, the present invention encompasses the use of glycerol/water combinations at ratios of about 99.9/0.1 by volume to about 70/30 by volume, about 99/1 to about 75/25 by volume, about 98/2 to about 80/20 by volume, about 95/5 to about 80/20 by volume, or about 90/10 to about 85/15 by volume. Combining the glycerol with water may actually be beneficial to reduce emissions. For example, testing according to the present invention indicated that combustion of an 80/20 v/v mixture of glycerol and water resulted in an 84% reduction in emissions of $CO$ and $CO_2$. In alternate embodiments, water could be mixed with glycerol prior to atomization of the glycerol or simultaneous with atomization (i.e., through use of a second nozzle providing a water mist into the combustion chamber).

In another embodiment, the glycerol viscosity is reduced by heating the glycerol prior to atomization. Although glycerol has a relatively high viscosity at ambient temperature, the viscosity is greatly reduced through heating. In particular, the viscosity of pure glycerol is reduced to less than about 16 cSt by heating to about 91° C. This viscosity is believed to represent an upper viscosity limit to allow for effective atomization using conventional devices. Heating of the glycerol can occur at any point prior to atomization of the glycerol and by any means useful for heating a liquid. For example, the glycerol could flow through a suitable a heat exchange unit. Alternately, coils (e.g., copper tubing) could be wrapped around a glycerol supply line, and the coils could flow a heated liquid to heat the glycerol, preferably to a temperature of about 100° C. (or any temperature greater than about 91° C.). Heated (and viscosity-reduced) glycerol can then move through a supply line directly into the combustion chamber. In preferred embodiments, the supply line is insulated to maintain the increased temperature (and decreased viscosity) of the glycerol. In particularly preferred embodiments, the supply line is further heated to ensure the temperature of the glycerol does not significantly decrease prior to reaching the atomization nozzle. For example, the glycerol supply line may be heated using an electrical heating resistance wire, which is preferably wrapped with an insulating material, such as ceramic thermal insulation. Of course, it is understood that a single heating method can be used for the heating the glycerol from the supply point to the point or atomization.

In one embodiment, preheating of the glycerol can be achieved without the addition of an external heat source. Rather, preheating can be achieved using a regenerative heat exchanger from the product gases. For example, the glycerol feed line can be wrapped around the combustion apparatus (particularly the combustion chamber), and the heat from the combustion could be used to heat the fuel source. Of course, proper equipment could be used to ensure heating was only up to the necessary temperature (i.e., less than about 100° C.).

In still another embodiment, particularly when the glycerol source is the by-product of an industrial process, the glycerol may already be heated (and thus have a reduced viscosity) as a result of the process of formation. For example, in the transesterification of triglycerides into biodiesel, a mixture of water, alcohol, and glycerol may be placed into a flash evaporator, heated to a temperature of about 100° C., and flashed to sub-atmospheric pressure to separate the alcohol and water from the glycerol. The alcohol is condensed and reused in the transesterification process, and the water is removed as waste. While glycerol is also typically removed as waste, according to the present invention, the glycerol (already heated from the flashing process) can be used directly in the combustion process of the present invention. Moreover, as described above, the water can be allowed to remain in the glycerol to further act as a viscosity reducing treatment. Still further, residual low-quality heat throughout the combustion apparatus could be utilized for heating the glycerol to the temperature needed for proper atomization when conventional atomizers are used.

Combinations of glycerol treatment can be also be used. For example, a heated glycerol waste stream from a biofuel production process could be transferred to a glycerol combustion chamber through a supply line that is insulated and/or heated by any known heating means, including those described previously.

Preferably, the glycerol is heated to a temperature useful for lowering the viscosity as described above, most preferably to a temperature useful for lowering the viscosity of the glycerol to less than or equal to about 20 cSt. In one specific embodiment, the reduced viscosity is achieved by heating glycerol to a temperature of at least about 91° C. At this temperature, the viscosity of glycerol should be reduced to less than about 20 cSt, and traditional pressure-atomization nozzles can be used to spray the hot glycerol into the combustion chamber. In certain embodiments, treating the glycerol prior to atomization comprises heating the glycerol to a temperature of at least about 60° C., at least about 65° C., at least about 70° C., at least about 75° C., at least about 80° C., at least about 85° C., at least about 90° C., at least about 95° C., or at least about 100° C. In specific embodiments, the method comprises heating the glycerol to a temperature between about 70° C. and about 120° C., between about 75° C. and about 115° C., between about 80° C. and about 110° C., between about 85° C., and about 105° C., or between about 90° C. and about 100° C.

Heating to such a temperature is also advantageous to the combustion process generally, as this decreases the enthalpy required to vaporize and oxidize the fuel. Of course, it is understood that the temperature to which the glycerol is heated to achieve a desired viscosity could be lower depending upon the type and content of any impurities present in the glycerol. For example, in the biofuel example provided above, the glycerol includes an alcohol fraction. By leaving such alcohol fraction in the glycerol, the viscosity of the glycerol may be reduced, and the temperature necessary to achieve the desired viscosity can be significantly reduced.

It is essential for the efficiency of the combustion process that the fuel and oxidizer components mix while in the gas phase. Specifically, liquid fuels must be vaporized before oxidation can begin, and liquid fuels are thus typically atomized to very small droplets to minimize the evaporation time. To obtain a glycerol combustor with a very high efficiency, it is useful to generate a spray with small, uniformly sized droplets. Accordingly, treatment of the glycerol prior to combustion can also include proper atomization of the glycerol liquid to form a fine spray or mist. Certain, specific embodiments for droplet formation are described herein. Of course, any method capable of generating such droplets can be used according to the invention.

Fuel oil burners can generally be categorized as gun-type (atomizing) burners, pot-type (vaporizing) burners, or rotary-type burners. Gun-type burners typically atomize the fuel oil by forcing the oil through a nozzle and spraying it into a gun-like airflow nozzle. The liquid forms microscopic particles or globules that are well mixed and partly evaporated before ignition in the combustion chamber. In a pot-type burner, the fuel evaporates into the combustion air, and such burners generally include natural draft burners, forced draft burners, and sleeve burners. Rotary burners employ a disc to which the fuel oil is applied, and rotation of the disc emits the fuel oil as a fine spray. While any of the noted types of burners could be used according to the invention, gun-type burners are particularly preferred. The very low vapor pressure of glycerol (around 0.001 mmHg at 25° C.) makes vaporizing-type burners unsuitable, and the previously noted high viscosity makes glycerol less amenable to rotary burners as a very fine mist of the glycerol is needed to maximize efficient combustion.

Burners using atomization of the fuel are particularly preferred according to the present invention. Thus, any know atomization apparatus could be used according to the invention. See, for example, U.S. Pat. No. 4,783,008, which is incorporated herein by reference. It should be noted that, when conventional atomization devices are used, further treatments, such as described above, should be used to reduce the viscosity of the liquid fuel. A skilled person armed with present disclosure would be able to assess whether viscosity reduction steps are needed in light of the atomization device being used.

In preferred embodiments, it is possible to forego any viscosity reducing treatment, if desired, by selection of the proper atomization device. For example, in one embodiment, an air blast nozzle could be used. Such nozzles are specifically designed to spray high-viscosity fluids by supplying pressurized air or gaseous fuel in an annular section around the liquid fuel feed line such that the pressurized air or gaseous fuel meets the liquid fuel feed at the tip of the nozzle immediately prior to discharge. The pressure of the air or gaseous fuel draws up the liquid fuel and creates a fine atomization of the liquid fuel. If an air blast nozzle is used according to the invention, a separate supply of air is required by the nozzle to initiate the atomization. For example, pressurized air could be provided at a pressure of at least about 5-10 psig, preferably about 10-20 psig, and at a rate of at least about 10 SLPM, preferably about 10-30 SLPM. Use of an air blast nozzle can be advantageous to reduce or eliminate the need to first reduce the viscosity of the glycerol feed. In one particularly preferred embodiment, however, the glycerol can be both heated to at least partially reduce the viscosity of the glycerol and atomized in an air blast nozzle. This is particularly useful in providing optimized atomization and combustion characteristics.

In one preferred embodiment, atomization is via a DELAVAN® siphon type SNA air atomizing nozzle (available from Goodrich Corporation, Charlotte, N.C.). Such nozzles use pressurized air to atomize the liquid glycerol fuel and can be particularly useful as an atomizing device that can properly atomize the high viscosity glycerol without initial viscosity reducing treatments (i.e., the glycerol can be atomized "cold"). When used with conventional fuels, such as kerosene, the nozzles require low air pressure (e.g., around 3-5 psi) and no fuel pump (as the pressurized air draws in the liquid fuel). In light of the high glycerol viscosity, it can be beneficial to use a separate pump to move the glycerol through the atomization nozzle. The air flow pressures and rates as described above could be used.

Controlling Combustion Chamber Air Flow

In some embodiments of the invention, it is useful to control air flow (i.e., an oxygen source) in a manner that facilitates glycerol combustion. Moreover, proper air flow control can be particularly beneficial for improving sustained operating temperature within the glycerol combustion chamber. Air flow that is generally directed in a straight line from the input zone to the exhaust can limit residence time of the combustible material within the combustion chamber and lower heat retention within the combustion chamber. According to the present invention, it has been found that one factor in facilitating efficient, sustained glycerol combustion is ensuring that glycerol droplets encounter maximized residence time within the combustion chamber to ensure complete oxidation. Accordingly rather than relying upon purely axial air flow, it is preferable to provide an aerodynamically restricted air flow such that the atomized glycerol is introduced into the glycerol combustion chamber with a defined flow pattern and air mixture.

One example of aerodynamically restricted air flow comprises the use of a swirl burner. Swirling jet flows (about the axis of the jet) are a preferable means for fuel/air mixing because of the added flame stability provided by the swirl. Enhanced fuel/air mixing can lead to lower pollutant emissions and greater efficiency. Moreover, proper mixing can also be beneficial to provide more stable combustion. Another advantage of using swirl is the reduction of the overall length of the combustion flame. Providing for a reduction in flame length is particularly useful in that it allows for a smaller combustion chamber, which in turn leads to reduced cost in building and maintenance of the combustion apparatus.

Two known types of swirl combustors useful according to the present invention are the swirl burner and the cyclone combustion chamber. In the swirl burner, swirling air is injected upstream of the combustion chamber such that the swirling air and co-flowing fuel are directed into a combustion chamber. In the cyclone burner, air is injected tangentially directly into the combustion chamber where it is mixed with the fuel and combustion occurs. The tangential momentum imparted by the swirling air, particularly when it expands suddenly, is converted to azimuthal vorticity. This azimuthal vortex acts to establish a strong recirculation zone just downstream of the fuel spray nozzles. The formation of an effective recirculation zone is particularly beneficial as it facilitates the mixing of a sufficiently large volume of hot products and radicals with cold reactants and raises the reactants above their auto-ignition temperature, thus ensuring the combustion process continues unimpeded. Either method of providing an air source with a swirl component could be used according to the invention.

In a preferred embodiment, air is injected into a combustion apparatus according to the present invention both axial to the flow of the liquid fuel and tangentially. Axial air flow can originate anywhere upstream of the atomization nozzle, such as through one or more upstream ports. Similarly, tangential air flow can originate through a plurality of side ports, which may be upstream of the atomization nozzle, downstream of the atomization nozzle (preferably close to the nozzle in the combustion chamber), or directly in the area of the atomization nozzle. The air streams mix to form a swirling velocity profile, which flows around the central fuel tube. The flow in such embodiments can be characterized by the nondimensional swirl number (S), which is defined in the following formula $$S = \frac{G\varphi}{G_z \frac{d}{2}}$$

wherein $G_\varphi$ is the mass flux of axial air, $G_z$ is the mass flux of tangential air, and d is the inner diameter of the combustion apparatus. A swirl number of zero represents a conventional co-flow burner with no swirl, and a swirl number of five represents a relatively high swirl number. In some embodiments, air flow is provided in a manner to have a swirl number of at least about 3, at least about 4, at least about 5, at least about 6, at least about 7, at least about 8, or at least about 9. In specific embodiments, the air flow is provided with a swirl number of about 3 to about 10, about 4 to about 10, about 5 to about 10, about 6 to about 10, about 7 to about 10, about 4 to about 9, about 4 to about 8, or about 4 to about 7.

Air flow in the combustion apparatus can also be defined in term of Reynolds number, which is a dimensionless ratio of dynamic pressure and shearing stresses within a flow environment. In particular, Reynolds number is calculated based on air flow rate, the diameter of the combustion chamber, and the viscosity of room temperature air, and it can be used to determine whether flow is laminar, transient, or turbulent. In certain embodiments, process parameters are controlled such that air flow is laminar. In specific embodiments, air flow in the combustion chamber is provided and/or controlled such that Reynolds number is less than about 3,000, less than about 2,800, less than about 2,600, less than about 2,400, less than about 2,300, less than about 2,200, or less than about 2,100. In specific embodiments, air flow is such that Reynolds number is in the range of about 1,500 to about 2,400, about 1,600 to about 2,300, about 1,700 to about 2,200, about 1,800 to about 2,200, or about 1,900 to about 2,100.

Air flow can, in part, be dictated by fuel flow rate. In preferred embodiments, it is desirable for the overall stoichiometry of the combustion reaction to be "lean" (i.e., have excess air in relation to the oxygen needed for combustion based on fuel flow rate). This "lean" combustion is particularly beneficial to reduce emissions of carbon monoxide (CO) and other pollutants. In operation, air flow is fixed, and the combustion chamber can be sized to achieve the desired Reynolds number, as described above. Nevertheless, due to the low heating value of the glycerol, the overall stoichiometry cannot be too lean of the excess air will quench the flame. As the glycerol is burned with more and more excess air, the swirl number (and thus the amount of recirculation of hot products and radicals and the residence time) must be increased.

At the top of the burner, glycerol fuel is sprayed (e.g., from an atomizer) and mixed with the swirling air and is thus combusted. In some embodiments, the combustion chamber can be shaped to further control air flow and maximize combustion. For example, the inner walls of the combustion chamber can be shaped or can include appropriate additional structure to form a chamber expansion in the area of the fuel spray. As more fully described below, the geometry created by the chamber expansion can be useful to create an air pressure reduction that rapidly expands the air flow and thus facilitates formation of a recirculation zone in the area of the combustion flame. In this zone, combustion gasses are effectively pulled from the outer regions of the flame back into the center of the flame. As the swirl number is raised, flame height will decrease dramatically. This can be likewise beneficial for reducing the necessary size of the combustion apparatus. Of course, as described previously, other air flow directing components can also be used to further facilitate formation and stabilization of the recirculation zone.

The ability to achieve and sustain glycerol combustion according to the invention arises in part from the determination of the fluid mechanic mechanism required to facilitate the necessary flow patterns within the combustion chamber. As described above, the angular momentum of the air introduced into the combustion chamber, particularly due to the induced swirl, causes a high pressure region along the perimeter of the chamber and a low pressure region along the centerline of the chamber. The axial momentum of the air moves the air up along the perimeter and the low pressure turns this air back downward along the centerline. This fluid mechanic mechanism for converting swirl (i.e., tangential flow) into axial vorticies causes the hot products and radicals from the combustion to be repeatedly brought back into the combustion zone. This effectively increases the residence time of the fuel molecules in the hot combustion zone, and the continual recirculation causes the fuel molecules to be repeatedly moved through the combustion zone until all fuel molecules are combusted. Thus, the present invention provides for the formation of a dynamic recirculation zone within the combustion chamber arising from specifically induced swirl from the designed introduction of both axial and tangential air and being facilitated by induced high and low pressure zone, which can in particular arise from the reactor design, as further described below.

Combustion Apparatus and Associated Components

In another aspect, the present invention provides a combustion apparatus useful for the combustion of glycerol, as described above. The combustion apparatus preferably comprises the various components described herein as useful in the combustion of glycerol. Although the present apparatus is particularly useful in the combustion of glycerol, it is specifically limited thereto. Rather, the combustion apparatus can be used in the combustion of any fuel, and particularly fuels that are otherwise difficult to use in a self-sustaining burn.

One embodiment of a combustion apparatus useful according to the present invention is partially illustrated in FIG. 1A, which particularly shows air flow in the apparatus. As seen therein, the apparatus 10 comprises an outer tube 110 that defines the outer shell of the apparatus 10 and a central fuel tube 120 through which liquid fuel (e.g., glycerol) is supplied. Air flow through the apparatus can be one or both axial from the bottom (as shown by arrows A) and tangential (as shown by arrows B). Although the apparatus is illustrated as having a vertical design, the invention also encompasses other geometries.

In a specific embodiment, illustrated in the top view of FIG. 2, four side ports 151, 152, 153, and 154 are provided to provide tangential air flow along lines B. As described previously, it can be particularly beneficial to provide both axial and tangential air flow to facilitate a swirling velocity profile around the central fuel tube 120, as illustrated by the line C in FIG. 1A. The portion of the combustion apparatus 10 above the central fuel tube 120 can be referred to as the combustion chamber 185. This is the portion of the combustion apparatus 10 where swirling air combines with the liquid fuel at a temperature to facilitate sustainable, efficient combustion of the liquid fuel. The dimensions of the combustion chamber can vary depending upon the overall apparatus design. In certain embodiments, the dimensions of the combustion chamber are minimized to increase heat retention within the combustion chamber. The combustion chamber may also be referred to as a flame enclosure since this is the portion of the overall apparatus where the liquid fuel is literally burned in a flame.

Above the combustion chamber 185 is the exhaust 190. Although these areas of the combustion apparatus may be described separately, they may in effect be a single continuous element. For example, a combustion apparatus according to the invention could simply comprises a metal pipe that is properly insulated and has proper inner wall structure to support convective and feedback heating. In such an embodiment, the combustion chamber would simply comprise the area of the pipe above the point where the liquid fuel is atomized and released for burning. Likewise, the exhaust would simply be the terminal portion of the pipe where air and heat escape. Of course, the two areas could be physically separated, such as by one or more baffles 130.

In the embodiment of FIG. 1A, the central fuel tube 120 includes a heater/insulator apparatus 310 wrapped around the central fuel tube to heat the liquid fuel being flowed through the tube to ensure the liquid fuel is maintains sufficient heating to have a suitably low viscosity for atomization. The heater apparatus can comprise electrical heating resistance wire or any other apparatus that provides constant heating to the tube. The heater apparatus can comprise an insulating layer, as well as a material to compress the insulating layer and ensure a tight conformation against the central fuel tube. For example, heat resistant tape could be used. The insulating layer is further useful for preventing heating of the swirling air coming up through the combustion apparatus. For example, higher temperature air can have a lower density than cooler air, which can affect the swirl number calculations discussed previously. It is useful to keep the thickness of the heater apparatus to a minimum to avoid creating unnecessary obstructions for the swirling air within the combustion apparatus.

In addition to being formed to facilitate designed air flow through the apparatus, the combustion apparatus of the invention further comprises additional elements that form the necessary conditions for glycerol combustion. For example, the combustion apparatus can comprise one or more ports for delivery of a starter fuel for pre-heating of the apparatus to a sustaining glycerol combustion temperature. As illustrated in the embodiment of FIG. 1A, two ports 182 and 184 are provided in the sides of the outer tube 110. Preferably, such ports are provided upstream from the exit point of the central fuel tube 120 (e.g. upstream from, or slightly below, the atomizer). The dimensions of the starter fuel ports can vary depending upon the type of starter fuel used to pre-heat the apparatus. For example, when a gaseous starter fuel (e.g., methane or propane) is used, it is preferable for the ports to be of sufficient dimensions so that the starter fuel will not enter the flame at high velocity that could extinguish the flame. Providing separate ports for the starter fuel also allows for the simultaneous burning of both starter fuel and liquid fuel, such as glycerol. Placement upstream from the exit point of the central fuel tube is further beneficial to assist in heating the liquid fuel in the central fuel tube as it reaches the exit point, thus further lowering viscosity and further improving atomization of the liquid fuel.

In the embodiment of FIG. 1A, the combustion apparatus 10 includes zonal restrictors 115 and 117 in the area of the exit point of the central fuel tube 120. In the cross-section of FIG. 1A, the zonal restrictors are bifurcated horizontally by the starter fuel ports 182 and 184, but the zonal restrictors are actually two single pieces (i.e., a left piece and a right piece), and the fuel ports extend through the two pieces. A zonal restrictor according to the invention is a structural feature present at any defined zone of the combustion apparatus that restricts the dimensions of the apparatus. In preferred embodiments, a zonal restrictor has a defined shape that can provide specific air flow characteristics and facilitate air pressure increases or decreases. In FIG. 1A, the zonal restrictors 115 and 117 are two separate pieces (left and right). In other embodiments, a single piece that is present on the entire inner circumference of the outer tube 110 could alternately be used. Likewise, more than two zonal restrictors could be used and could be positioned at different levels along the apparatus.

The zonal restrictors may have a designed geometry to create a chamber expansion downstream from the exit point of the glycerol from the central fuel tube (e.g., downstream from the atomizer) that can be useful to facilitate an air pressure reduction that rapidly expands the air flow. In FIG. 1A, the zonal restrictors 115 and 117 create a 60° cone in the area of the exit point of the central fuel tube 120. In other embodiments, different geometries could be formed to improve air flow or other function of the inventive apparatus. For example, in certain embodiments, the combustion apparatus may be formed such that the inner walls of the combustion chamber immediately downstream from the atomizer apparatus have an angled portion, the angled portion having an angle that is between about 20° and about 80°, the angle being measure relative to a line perpendicular to the central fuel tube 120, and thus the fuel flow. The specific angle of the angled portion must be within the defined parameters to maintain proper air flow. If the angle is too small, flow separation may occur. If the angle is too great, proper vortex formation can be hindered.

This is particularly illustrated in detail view of FIG. 1C. As seen therein, zonal restrictor 117 is formed such that the upper portion thereof has a preferred angle of 60° relative to a line perpendicular to the central fuel tube 120 (the dashed horizontal line). Zonal restrictor 115 is illustrated such that the top portion thereof has a variable angle θ that is between about 30° and about 80° relative to the dashed horizontal line. In other embodiments, the inner walls of the combustion chamber immediately downstream from the atomizer are angled such that the angle θ is between about 45° and about 75°, between about 50° and about 70°, or between about 55° and about 65°. In one embodiment, θ is about 60°.

Above the exit point of the central fuel tube 120, the low pressure zone created by the zonal restrictors and the swirling air flow combine to form a recirculation zone 250. This recirculation zone is located within the combustion chamber, as the recirculation enhances complete combustion of the liquid fuel.

Still further elements can be present to facilitate thermal feedback within the combustion apparatus. For example, the combustion chamber can include one or more baffles 130 that resist direct air flow out of the chamber and assist in recirculation of the hot products and radicals. The combustion apparatus can still further include a cap 135 to maintain heat within the combustion chamber. As seen in FIG. 1A, the cap 135 is positioned centrally over the exhaust so as to allow air flow out of the combustion chamber only around the periphery of the exhaust. Other components in place of or in addition to the cap could also be used, though. For example, metal coils, concave or convex metal plates, wire mesh, or donut shaped plates could be used. Any structure useful to reduce heat flow, air flow, or heat and air flow out of the combustion chamber could be used. Moreover, it is not necessary for the cap or similar structure to be positioned outside of the combustion chamber. Rather, the cap structure is simply placed in the area of the exhaust from the chamber. Thus, the cap structure could be positioned within the combustion chamber at varying heights from the combustion flame.

The use of a cap, as described above, is beneficial to capture and hold the axial vortices resulting from the induced swirl, thus generating a strong recirculation zone. A secondary effect of the cap is to transfer heat back into the combustion flame. This fluid mechanic effect requires a solid surface. The height of the cap can also be important. If it the cap is too close to the atomizing nozzle, the vortices described herein will not form; however, if it is too far away, the cap won't efficiently capture the vortices. In some embodiments, the cap is position a distance away from the nozzle that is a relation to the diameter of the combustion chamber. For example, the distance between the cap and the atomization nozzle can be about 1 to 3 diameters, about 1.5 to about 2.5 diameters, or about 2 diameters, based on the diameter of the combustion chamber.

An alternate embodiment of a combustion apparatus according to the invention is illustrated in FIG. 1B. As seen therein, the combustion apparatus 10 may comprises a first central fuel tube 120 for delivery of the liquid fuel and a second central fuel tube 125 for delivery of a starter fuel.

Positioned at the end of the central fuel tube 120 is an atomizer apparatus 200. A particular embodiment of an atomizer is illustrated in FIG. 3. As seen therein, the atomizer apparatus 200 includes a central opening 210 for passage of the liquid fuel and an annular opening 220 for passage of pressurized air. In some embodiments, the annular opening may be used for passage of a pre-heating fuel for preheating the combustion apparatus. The atomizer apparatus 200 further includes a side connection 230 for providing the pressurized air (or pre-heating fuel) and a bottom connection 240 for delivery of the liquid fuel. For example, the central fuel tube could be connected to the bottom connection.

A more detailed view of a combustion apparatus according to the present invention is provided in FIG. 4. Again, the apparatus 10 comprises an outer tube 110 that defines the outer shell of the apparatus 10 and a central fuel tube 120 through which liquid fuel is supplied. An atomizer apparatus 200 is positioned at the end of the central fuel tube 120 such that liquid fuel from the central fuel tube 120 passes through the central opening 210 in the atomizer apparatus 200 and pressurized air passes through an annular opening 220 in the atomizer apparatus 200.

In the embodiment of FIG. 4, the recirculation zone 250 of the combustion apparatus 10 includes radiative shielding 350. As previously described, this can comprise any material useful to hold heat within the combustion apparatus and assist in recirculating the heated air and maintain the necessary combustion temperature within the apparatus. In some embodiments, the zonal restrictors 115 and 117 may be formed of a material that functions as radiative shielding to further increase heat retention within the recirculation zone 250 of the combustion apparatus 10. Moreover, this embodiment also illustrates the use of an insulating layer 360 surrounding the combustion apparatus 10. In particular, the insulating layer is present around the area of the combustion chamber, but it is understood that the insulating layer could enclose a greater or lesser portion of the combustion apparatus.

The combustion apparatus can be combined with further components, such as illustrated in FIG. 5. In particular, the further components can comprise a liquid fuel supply 410. This can be a storage tank, as illustrated, or can be a component of a separate process. For example, the glycerol combustion methods of the invention can be particularly combined with a biofuel production process that produces glycerol as a by-product. Accordingly, a glycerol combustion apparatus could be placed in-line with the biofuel production process such that glycerol produced in making the biofuel is continuously withdrawn from the biofuel production process and provided to the glycerol combustion apparatus. Thus, the liquid fuel supply 410 could simply be a supply line or could be a temporary storage tank. For example, the liquid fuel supply 410 could be a temporary storage tank including separation means for removing other process by-products (e.g., water or methanol). Likewise, the liquid fuel supply 410 could be a temporary storage tank wherein glycerol may be mixed with other fuels, fuel extenders, or fuel viscosity reducers.

The glycerol can be fed throughout the combination of components via a fuel supply line 405, which can interconnect multiple components. In light of the relatively high viscosity of glycerol and other possible liquid fuels, it can be useful to include a pump 420 for facilitating transfer of the glycerol. As illustrated in FIG. 5, the pump 420 is placed upstream of heating. The pump, however, could be placed in other areas of the flow line. Moreover, multiple pumps could be used in different areas of the supply line.

In certain embodiments, the liquid fuel is pumped through the supply line 405 to a heater apparatus 430. The heater apparatus can comprise any type of heater useful to heat a liquid fuel, such as glycerol. In some embodiments, the heater apparatus is a heat exchanger and may include a series of pipes or tubes in close proximity to the supply line 405 that can be flowed through with a heat transfer liquid to heat the glycerol. In other embodiments, the heater apparatus 430 may comprise a length of electrical resistance heating tape, or the like, that may directly provide heat to the supply line 405 and heat the glycerol. Such heat tape could be use at any area along the supply line 405. Preferably, once the liquid fuel has been heated, the supply line is at least insulated to maintain the glycerol temperature. In specific embodiments, the glycerol may be heated using a specific heating apparatus and may further be heated by providing additional heating means to the supply line downstream from the heating apparatus to maintain glycerol temperature. For example, after exiting the heating apparatus, the supply line may be wrapped with an electrical resistance heating tape and an insulating material. Of course, as described above, the heater apparatus is optional depending upon the type of atomization device used and/or the use of alternate heating methods, such as regenerative heating.

The glycerol is fed from the supply line 405 to the combustion apparatus 10, particularly to the central fuel tube 120. In particular embodiments, the supply line may be continuous with the fuel tube. In other words, the supply line and the fuel tube could be a single continuous piece. Air can be supplied to the combustion apparatus axially and/or tangentially, as described above. For example, axial air flow could be provided through ports 161 and 163, and tangential air flow could be provided through ports 151 and 153.

Industrial Uses of the Methods and Apparatus

The combustion apparatus can be used in the methods of the invention and combined with various industrial processes. In one embodiment, the invention provides a method for continuous recycling of waste glycerol for production of reaction heating in a biofuel production process.

The methods of glycerol combustion described herein can be used for combustion of glycerol as a fuel, wherein the glycerol is obtained from any source. However, the present invention is particularly useful when the glycerol is provided as a waste stream from an industrial process as opposed to a marketable commodity. As previously pointed out, pure glycerol is a valuable commodity with a variety of uses. Glycerol produced as a waste product in an industrial process, though, typically includes impurities and requires extensive processing to obtain the level of purity needed to market the glycerol for most end uses. Waste glycerol typically thus represents a source of "free" fuel when used according to the present invention.

For example, in the case of the biofuel production process, a substantial volume of waste glycerol is formed; however, it is not economically viable to purify the glycerol as a marketable commodity. The waste glycerol is suitable, though, for use as a fuel. Thus, a glycerol combustion apparatus according to the invention can be incorporated into the biofuel production apparatus, and the waste glycerol produced in the biofuel production process can be withdrawn directly from the biofuel production stream and introduced in the apparatus for carrying out the glycerol combustion process of the invention. In certain embodiments, the combination of the biofuel production apparatus and the glycerol combustion apparatus can include components useful to prepare the glycerol for combustion. For example, if a viscosity reducing liquid is to be combined with the glycerol, a line for incorporating the liquid can be included. Likewise, various filter components can be included to remove contaminants, such as residual catalyst. Further, components for removing lower boiling components, such as water, from the glycerol can be incorporated to "flash off" the lower boiling point components. Such components can themselves be directed back into the biofuel production process as appropriate (such as recycling alcohol for use in a triglyceride transesterification process or water for use in a triglyceride hydrolysis process). The heat generated in the glycerol combustion can be directed back into the biofuel production process (such as heating to facilitate the hydrolysis reaction). In other embodiments, the heat can be used for other purposes, such as electricity generation.

Such embodiments of the present invention are particularly characterized in that they provide continuous processes requiring only a start-up phase. Once the glycerol combustion chamber is heated, as described above, heat for the biofuel production process can be generated from glycerol combustion using glycerol that is continuously withdrawn from the biofuel production process. Thus, a self-sustaining heat source is provided.

EXPERIMENTAL

The present invention is more fully illustrated by the following examples, which are set forth to illustrate the present invention and are not to be construed as limiting thereof.

Example 1

Combustion of Glycerol

A combustion apparatus similar to that illustrated in FIG. 1A was used to achieve sustained combustion of glycerol. Initially, the combustion chamber of the apparatus was preheated using propane as a pre-heating fuel. The propane was provided with axial air flow at a rate of 30 standard liters per minute (SLPM) and tangential air flow at a rate of 150 SLPM creating a swirl number calculated to be 17.6 and a Reynolds number of 2,200. Propane flow was started at a rate of 15-20 SLPM and the fuel was ignited.

Air flow through the atomization nozzle was gradually increased from zero to 18 SLPM, avoiding providing an airflow that would extinguish the propane flame. The combustion chamber was heated with the propane flame until the top of the flame enclosure glowed bright red, indicating the temperature was between about 80° and about 1,000° C.

Glycerol was pumped through the atomization nozzle, beginning at a rate of about 1 gram per second, and the nozzle air flow rate was increased to about 30 SLPM. The propane flow was stopped, and the flame continued to burn fueled exclusively by the glycerol.

Example 2

Emissions Testing

Emissions from glycerol combustion as described in Example 1 were collected and tested to determine concentrations of various emissions components. Presence of acrolein and other aldehydes was tested using DNPH (2,4-dinitrophenyl-hydrazine) cartridges and high performance liquid chromatography (HPLC). Test cartridges containing a porous plug of DNPH were purchased from a commercial vendor. In practice, exhaust from the glycerol combustion was collected and forced through the DNPH cartridge via low air pressure. Testing functioned that that any ketone or aldehyde compounds present in the exhaust reacted with the DNPH and were retained in the cartridge plug. The DNPH plug was eluted in acetonitrile, and the solution was subjected to HPLC analysis to quantify the mass of particular DNPH derivatives present. Aldehyde concentration was calculated using the mass measurement from the HPLC analysis compared with the volume of exhaust gas that was originally pulled through the cartridge.

As the DNPH cartridge include plastic components, it was necessary to collect exhaust from the glycerol combustion and then cool the exhaust. This was achieved using a flask equipped with a rubber stopper and two tubes, each with a ball valve. The total volume of the flask/tube apparatus was 1.1 L. With the ball valves open, one tube was placed in the glycerol combustion exhaust, and the other tube was hooked to a vacuum. After 4-6 minutes of collection, both ball valves were closed simultaneously trapping a fixed volume of exhaust gasses within the flask. Compressed air was used to "push" the exhaust gasses out of the flask apparatus and through the DNPH cartridge.

Multiple tests were performed, and the highest acrolein concentration detected was 17.5 parts per billion (ppb), which is well below the levels believed to be dangerous to human health, or about 90 ppb.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A combustion apparatus for combustion of a high viscosity, low heating value liquid fuel having an ambient viscosity of greater than 15 cSt and having a heating value in the range of about 10 MJ/kg to about 75 MJ/kg, the apparatus comprising:
   an outer shell;
   a combustion chamber having a combustion zone being open to about ambient pressure, and having an inner surface providing radiant and convective feedback heating at a combustion temperature in the range of about 600° C. to about 1,200° C.;
   a central fuel tube for introduction of the high viscosity, low heating value liquid fuel into the combustion chamber;
   an atomizer apparatus attached to the central fuel tube for atomizing the high viscosity, low heating value liquid fuel prior to introduction of the high viscosity, low heating value liquid fuel into the combustion chamber; and
   a plurality of air ports positioned on the shell for providing an air flow that is one or both of axial and tangential to the flow of the high viscosity, low heating value liquid fuel through the central fuel tube;
   one or more components that create dynamic recirculation within the combustion chamber and increase the residence time of combustion products within the combustion zone; and
   an exhaust for venting the combustion chamber, wherein the exhaust comprises one or more components for limiting heat flow, air flow, or heat and air flow out of the combustion chamber.

2. The apparatus of claim 1, wherein the exhaust comprises a cap positioned centrally over the exhaust so as to provide an opening only around the periphery of the exhaust.

3. The apparatus of claim 2, wherein the cap is positioned a distance away from the atomizer, said distance being equal to 1.5 to 2.5 times the diameter of the combustion chamber.

4. The apparatus of claim 1, further comprising one or more air baffles attached to the inner surface of the combustion chamber for deflecting heat flow, air flow, or heat and air flow from the sides of the combustion chamber back toward a central portion of the combustion chamber.

5. The apparatus of claim 1, further comprising one or more zonal restrictors that modify the inner geometry of the apparatus so as to form an expansion zone downstream from the atomizer.

6. The apparatus of claim 1, further comprising a second fuel tube for providing a pre-heating fuel.

7. The apparatus of claim 1, further comprising one or more ports positioned on the shell for providing a pre-heating fuel.

8. The apparatus of claim 7, wherein the one or more pre-heating fuel ports are positioned to be upstream from the atomizer.

9. The apparatus of claim 1, wherein the atomizer apparatus is a siphon type air atomizer nozzle.

10. The apparatus of claim 1, further comprising a separate heater apparatus for heating the high viscosity, low heating value liquid fuel prior to introduction into central fuel tube.

11. The apparatus of claim 1, further comprising a pump for pumping the high viscosity, low heating value liquid fuel through the central fuel tube.

12. The apparatus of claim 1, wherein the central fuel tube further comprises one or more components for heating or maintaining the high viscosity, low heating value liquid fuel within the central fuel tube at a defined temperature.

* * * * *